(12) United States Patent
McCann et al.

(10) Patent No.: US 9,923,984 B2
(45) Date of Patent: Mar. 20, 2018

(54) METHODS, SYSTEMS, AND COMPUTER READABLE MEDIA FOR REMOTE AUTHENTICATION DIAL IN USER SERVICE (RADIUS) MESSAGE LOOP DETECTION AND MITIGATION

(71) Applicant: Oracle International Corporation, Redwood Shores, CA (US)

(72) Inventors: Thomas Matthew McCann, Raleigh, NC (US); Kedar Kashinath Karmarkar, Pune (IN)

(73) Assignee: Oracle International Corporation, Redwood Shores, CA (US)

(*) Notice: Subject to any disclaimer, the term of this patent is extended or adjusted under 35 U.S.C. 154(b) by 189 days.

(21) Appl. No.: 14/928,660

(22) Filed: Oct. 30, 2015

(65) Prior Publication Data
US 2017/0126522 A1    May 4, 2017

(51) Int. Cl.
G06F 15/173    (2006.01)
H04L 29/08    (2006.01)

(52) U.S. Cl.
CPC .......... *H04L 67/28* (2013.01); *H04L 67/2814* (2013.01)

(58) Field of Classification Search
None
See application file for complete search history.

(56) References Cited

U.S. PATENT DOCUMENTS

| | | | |
|---|---|---|---|
| 1,872,857 A | 4/1931 | Wesson et al. | |
| 5,878,347 A | 3/1999 | Joensuu et al. | |
| 6,006,098 A | 12/1999 | Rathnasabapathy et al. | |
| 6,298,383 B1 | 10/2001 | Gutman et al. | |
| 6,836,477 B1 | 12/2004 | West, Jr. et al. | |
| 6,967,956 B1 | 11/2005 | Tinsley et al. | |
| 7,292,592 B2 | 11/2007 | Rune | |
| 7,310,307 B1 | 12/2007 | Das et al. | |
| 7,319,857 B2 | 1/2008 | Baldwin et al. | |
| 7,551,926 B2 | 6/2009 | Rune | |

(Continued)

FOREIGN PATENT DOCUMENTS

CN    1809072 A    7/2006
CN    1 01 001 440 A    7/2007

(Continued)

OTHER PUBLICATIONS

Communication under Rule 71(3) EPC for European Application No. 12 751 986.6 (dated Jun. 8, 2016).

(Continued)

*Primary Examiner* — Brian Whipple
(74) *Attorney, Agent, or Firm* — Jenkins, Wilson, Taylor & Hunt, P.A.

(57) ABSTRACT

Methods, systems, and computer readable media for remote authentication dial in user service (RADIUS) message loop detection and mitigation are disclosed. One method includes receiving, at a RADIUS proxy node, a RADIUS signaling message. The method further includes determining whether the RADIUS signaling message includes an attribute with a host identifier corresponding to the RADIUS proxy node. In response to determining that the RADIUS signaling message includes the attribute that includes the host identifier corresponding to the RADIUS proxy node, performing a RADIUS loop mitigation action for the RADIUS signaling message.

12 Claims, 12 Drawing Sheets

(56) References Cited

U.S. PATENT DOCUMENTS

| | | |
|---|---|---|
| 7,738,488 B2 | 6/2010 | Marsico et al. |
| 7,792,981 B2 | 9/2010 | Taylor |
| 7,814,015 B2 | 10/2010 | Benedyk et al. |
| 7,844,745 B1 | 11/2010 | Darbyshire et al. |
| 7,916,685 B2 | 3/2011 | Schaedler et al. |
| 7,996,541 B2 | 8/2011 | Marathe et al. |
| 8,015,293 B2 | 9/2011 | Schaedler et al. |
| 8,532,110 B2 | 9/2013 | McCann et al. |
| 8,547,908 B2 | 10/2013 | Marsico |
| 8,615,237 B2 | 12/2013 | Baniel et al. |
| 8,737,304 B2 | 5/2014 | Karuturi et al. |
| 8,825,060 B2 | 9/2014 | McCann et al. |
| 8,831,076 B2 | 9/2014 | Yen |
| 8,918,469 B2 | 12/2014 | Sprague et al. |
| 8,942,747 B2 | 1/2015 | Marsico |
| 9,059,948 B2 | 6/2015 | Schaedler et al. |
| 9,148,524 B2 | 9/2015 | Deo |
| 9,288,169 B2 | 3/2016 | Schaedler et al. |
| 9,319,378 B2 | 4/2016 | McCann |
| 9,668,134 B2* | 5/2017 | McCann .............. H04W 12/06 |
| 9,668,135 B2* | 5/2017 | McCann .............. H04W 12/06 |
| 2001/0028636 A1 | 10/2001 | Skog et al. |
| 2002/0147845 A1 | 10/2002 | Sanchez-Herrero |
| 2002/0194378 A1 | 12/2002 | Foti |
| 2002/0196775 A1 | 12/2002 | Tuohino et al. |
| 2003/0040280 A1 | 2/2003 | Koskelainen |
| 2003/0131151 A1 | 7/2003 | Roach et al. |
| 2004/0098612 A1 | 5/2004 | Lee et al. |
| 2004/0103157 A1 | 5/2004 | Requena et al. |
| 2004/0152469 A1 | 8/2004 | Yla-Outinen et al. |
| 2004/0205212 A1 | 10/2004 | Huotari et al. |
| 2004/0223489 A1 | 11/2004 | Rotsten et al. |
| 2004/0225878 A1 | 11/2004 | Costa-Requena et al. |
| 2004/0242227 A1 | 12/2004 | Huotari et al. |
| 2004/0246965 A1 | 12/2004 | Westman et al. |
| 2004/0260816 A1 | 12/2004 | Skog et al. |
| 2005/0007984 A1 | 1/2005 | Shaheen et al. |
| 2005/0009520 A1 | 1/2005 | Herrero et al. |
| 2005/0058125 A1 | 3/2005 | Mutikainen et al. |
| 2005/0078642 A1 | 4/2005 | Mayer et al. |
| 2005/0094594 A1 | 5/2005 | Roh |
| 2005/0120198 A1 | 6/2005 | Bajko et al. |
| 2005/0124341 A1 | 6/2005 | Myllymaki et al. |
| 2005/0136926 A1 | 6/2005 | Tammi et al. |
| 2005/0155036 A1 | 7/2005 | Tiainen et al. |
| 2005/0159156 A1 | 7/2005 | Bajko et al. |
| 2005/0227675 A1 | 10/2005 | Lim et al. |
| 2005/0235000 A1 | 10/2005 | Keil |
| 2006/0002308 A1 | 1/2006 | Na et al. |
| 2006/0030320 A1 | 2/2006 | Tammi et al. |
| 2006/0045249 A1 | 3/2006 | Li et al. |
| 2006/0068762 A1 | 3/2006 | Baldwin et al. |
| 2006/0068816 A1 | 3/2006 | Pelaez et al. |
| 2006/0077926 A1 | 4/2006 | Rune |
| 2006/0078119 A1 | 4/2006 | Jee et al. |
| 2006/0136557 A1 | 6/2006 | Schaedler et al. |
| 2006/0161512 A1 | 7/2006 | Schaedler et al. |
| 2006/0172730 A1 | 8/2006 | Matsuda |
| 2006/0221972 A1 | 10/2006 | Bhargava et al. |
| 2006/0259759 A1 | 11/2006 | Maino et al. |
| 2006/0274744 A1 | 12/2006 | Nagai et al. |
| 2007/0121596 A1 | 5/2007 | Kurapati et al. |
| 2007/0136590 A1 | 6/2007 | Nah et al. |
| 2007/0153995 A1 | 7/2007 | Fang et al. |
| 2007/0189215 A1 | 8/2007 | Wu et al. |
| 2007/0242637 A1 | 10/2007 | Dynarski et al. |
| 2007/0297419 A1 | 12/2007 | Asherup et al. |
| 2008/0002652 A1* | 1/2008 | Gupta .............. H01Q 1/2291 370/338 |
| 2008/0039104 A1 | 2/2008 | Gu et al. |
| 2008/0256251 A1 | 10/2008 | Huotari et al. |
| 2009/0080440 A1 | 3/2009 | Balyan et al. |
| 2009/0089435 A1 | 4/2009 | Terrill et al. |
| 2009/0129271 A1 | 5/2009 | Ramankutty et al. |
| 2009/0156213 A1 | 7/2009 | Spinelli et al. |
| 2009/0177796 A1 | 7/2009 | Falk et al. |
| 2009/0196231 A1 | 8/2009 | Giaretta et al. |
| 2009/0196290 A1 | 8/2009 | Zhao et al. |
| 2009/0221310 A1 | 9/2009 | Chen et al. |
| 2009/0232011 A1 | 9/2009 | Li et al. |
| 2009/0264097 A1 | 10/2009 | Cai et al. |
| 2009/0265467 A1 | 10/2009 | Peles |
| 2009/0305684 A1 | 12/2009 | Jones et al. |
| 2009/0313379 A1 | 12/2009 | Rydnell et al. |
| 2010/0268814 A1 | 10/2010 | Cross et al. |
| 2010/0290392 A1 | 11/2010 | Rasanen et al. |
| 2010/0291923 A1 | 11/2010 | Zhou et al. |
| 2010/0299451 A1 | 11/2010 | Yigang et al. |
| 2010/0311392 A1 | 12/2010 | Stenfelt et al. |
| 2010/0331023 A1 | 12/2010 | Cai et al. |
| 2011/0040845 A1 | 2/2011 | Cai et al. |
| 2011/0116378 A1 | 5/2011 | Ramankutty et al. |
| 2011/0116382 A1 | 5/2011 | McCann et al. |
| 2011/0158090 A1 | 6/2011 | Riley et al. |
| 2011/0165901 A1 | 7/2011 | Baniel et al. |
| 2011/0199906 A1 | 8/2011 | Kanode et al. |
| 2011/0200053 A1 | 8/2011 | Kanode et al. |
| 2011/0202612 A1 | 8/2011 | Craig et al. |
| 2011/0202614 A1 | 8/2011 | Craig et al. |
| 2011/0202676 A1 | 8/2011 | Craig et al. |
| 2011/0211574 A1 | 9/2011 | Li et al. |
| 2011/0225113 A1 | 9/2011 | Mann |
| 2011/0225280 A1 | 9/2011 | Delsesto et al. |
| 2011/0225281 A1 | 9/2011 | Riley et al. |
| 2011/0225306 A1 | 9/2011 | Delsesto et al. |
| 2011/0282904 A1 | 11/2011 | Schaedler et al. |
| 2011/0302244 A1 | 12/2011 | McCann et al. |
| 2011/0314178 A1 | 12/2011 | Kanode et al. |
| 2012/0089993 A1 | 4/2012 | Alarcon et al. |
| 2012/0096177 A1 | 4/2012 | Rasanen |
| 2012/0124220 A1 | 5/2012 | Zhou et al. |
| 2012/0129488 A1 | 5/2012 | Patterson et al. |
| 2012/0155389 A1 | 6/2012 | McNamee et al. |
| 2012/0155470 A1 | 6/2012 | McNamee et al. |
| 2012/0177028 A1 | 7/2012 | Mo et al. |
| 2012/0201203 A1 | 8/2012 | Miyagawa et al. |
| 2012/0202550 A1 | 8/2012 | Marsico |
| 2012/0207015 A1 | 8/2012 | Marsico |
| 2012/0224524 A1 | 9/2012 | Marsico |
| 2012/0224531 A1 | 9/2012 | Karuturi et al. |
| 2012/0225679 A1 | 9/2012 | McCann et al. |
| 2012/0226758 A1 | 9/2012 | Sprague et al. |
| 2012/0226814 A1 | 9/2012 | Stucker |
| 2012/0236871 A1 | 9/2012 | Wallace et al. |
| 2012/0239771 A1 | 9/2012 | Rasanen |
| 2012/0311064 A1 | 12/2012 | Deo |
| 2013/0171990 A1 | 7/2013 | McCann et al. |
| 2013/0246639 A1 | 9/2013 | Nedbal et al. |
| 2013/0279497 A1 | 10/2013 | Verma et al. |
| 2013/0304843 A1 | 11/2013 | Chow et al. |
| 2014/0207941 A1 | 7/2014 | McCann |
| 2014/0258423 A1 | 9/2014 | Schaedler et al. |
| 2014/0321278 A1 | 10/2014 | Cafarelli et al. |
| 2014/0342690 A1 | 11/2014 | Tanouchev et al. |
| 2014/0355523 A1 | 12/2014 | Congdon et al. |
| 2015/0036486 A1 | 2/2015 | McMurry et al. |
| 2015/0149656 A1 | 5/2015 | McMurry et al. |
| 2016/0373348 A1 | 12/2016 | Renzullo et al. |
| 2017/0048190 A1 | 2/2017 | McCann |
| 2017/0048202 A1 | 2/2017 | McCann |
| 2017/0048703 A1 | 2/2017 | McCann |
| 2017/0048704 A1 | 2/2017 | McCann |
| 2017/0126522 A1* | 5/2017 | McCann .............. H04L 67/28 |
| 2017/0238178 A1 | 8/2017 | McCann |
| 2017/0238179 A1 | 8/2017 | McCann |

FOREIGN PATENT DOCUMENTS

| | | |
|---|---|---|
| CN | 101079742 A | 11/2007 |
| CN | 101247321 A | 8/2008 |
| CN | 101277541 A | 10/2008 |
| CN | 101483826 A | 7/2009 |
| CN | 101867873 A | 10/2010 |
| CN | 101945047 A | 1/2011 |

(56) References Cited

FOREIGN PATENT DOCUMENTS

| | | |
|---|---|---|
| CN | 102239481 A | 11/2011 |
| CN | 201080065174.6 | 6/2015 |
| CN | 100037 | 7/2016 |
| CN | 103477661 B | 10/2016 |
| CN | 201280019607.3 | 12/2016 |
| CN | 201280013938.6 | 3/2017 |
| CN | 201280018298.8 | 3/2017 |
| CN | 201280018288.4 | 4/2017 |
| EP | 1 357 720 A1 | 10/2003 |
| EP | 1 630 999 A1 | 3/2006 |
| EP | 2 107 725 A1 | 10/2009 |
| EP | 2 234 422 A1 | 9/2010 |
| EP | 2 242 205 A1 | 10/2010 |
| EP | 2 220 841 B1 | 9/2011 |
| EP | 1 846 832 B1 | 4/2012 |
| EP | 2 466 828 A1 | 6/2012 |
| EP | 2 522 103 A2 | 11/2012 |
| EP | 2 577 930 A2 | 4/2013 |
| EP | 2 681 940 B1 | 5/2016 |
| EP | 2 681 939 B1 | 9/2016 |
| EP | 2 522 102 B1 | 11/2016 |
| EP | 2 681 938 B2 | 12/2016 |
| JP | H10-98470 A | 4/1998 |
| JP | H11-224219 A | 8/1999 |
| JP | 2004-242326 A | 8/2004 |
| JP | 2006-513631 | 4/2006 |
| JP | 4041038 B2 | 1/2008 |
| JP | 2009-537102 | 10/2009 |
| JP | 2010-527520 | 8/2010 |
| JP | 2010-0278884 A | 12/2010 |
| JP | 2013-527999 T | 7/2013 |
| JP | 5732550 B2 | 6/2015 |
| JP | 5758508 B2 | 8/2015 |
| JP | 5759064 B2 | 8/2015 |
| JP | 5938052 B2 | 6/2016 |
| JP | 5950943 B2 | 7/2016 |
| JP | 6091657 B2 | 2/2017 |
| WO | WO 2004/064442 A1 | 7/2004 |
| WO | WO 2006/066149 A2 | 6/2006 |
| WO | WO 2009/058067 A1 | 5/2009 |
| WO | WO 2009/070179 A1 | 6/2009 |
| WO | WO 2009/086759 A1 | 7/2009 |
| WO | WO 2010/139360 A1 | 12/2010 |
| WO | WO 2011/082035 A2 | 7/2011 |
| WO | WO 2011/082090 A2 | 7/2011 |
| WO | WO 2011/082895 A1 | 7/2011 |
| WO | WO 2011/156274 A2 | 12/2011 |
| WO | WO 2012/106710 A1 | 8/2012 |
| WO | WO 2012/118959 A1 | 9/2012 |
| WO | WO 2012/118963 A1 | 9/2012 |
| WO | WO 2012/118967 A1 | 9/2012 |
| WO | WO 2012/119147 A1 | 9/2012 |
| WO | WO 2012/154674 A2 | 11/2012 |
| WO | WO 2014/116464 A1 | 7/2014 |

OTHER PUBLICATIONS

Letter Regarding Notice of grant for Japanese Patent Application No. 2013-552714 (dated May 31, 2016).
Decision to grant a European patent pursuant to Article 97(1) EPC for European Application No. 12752952.7 (dated Apr. 29, 2016).
Official Notice of Grant for Japanese Patent Application No. 2013-556860 (dated Apr. 26, 2016).
Notification of the First Office Action for Chinese Patent Application No. 201280018298.8 (dated Mar. 3, 2016).
Communication pursuant to Article 94(3) EPC for European Patent Application No. 10841605.8 (dated Feb. 22, 2016).
Communication under Rule 71(3) EPC for European Patent Application No. 12752952.7 (dated Feb. 10, 2016).
Letter Regarding Notice of Grant for Japanese Patent Application No. 2013-556855 (dated Feb. 2, 2016).
Notification of the First Office Action for Chinese Application No. 201280019607.3 (dated Feb. 1, 2016).
Notification of the First Office Action for Chinese Application No. 201280013938.6 (dated Jan. 27, 2016).
Notification of the First Office Action for Chinese Application No. 201280018297.3 (dated Jan. 15, 2016).
Notification of the First Office Action for Chinese Application No. 201280018288.4 (dated Dec. 29, 2015).
Communication pursuant to Article 94(3) EPC for European Application No. 12 751 986.6 (dated Dec. 22, 2015).
Notice of Allowance and Fee(s) Due for U.S. Appl. No. 13/748,547 (dated Dec. 11, 2015).
Letter Regarding Office Action for Japanese Patent Application No. 2013-552714 (dated Dec. 8, 2015).
Letter Regarding Final Rejection for Japanese Patent Application No. 2013-556860 (dated Nov. 17, 2015).
Communication of European publication number and information on the application of Article 67(3) EPC for European Application No. 14702996.1 (dated Nov. 4, 2015).
Notice of Allowance and Fee(s) Due and Applicant-Initiated Interview Summary for U.S. Appl. No. 14/190,071 (dated Oct. 30, 2015).
Advisory Action for U.S. Appl. No. 13/748,547 (dated Oct. 16, 2015).
Supplemental Notice of Allowability & Response to Rule 312 Communication for U.S. Appl. No. 13/465,552 (dated Aug. 27, 2015).
Final Office Action for U.S. Appl. No. 13/748,547 (dated Aug. 10, 2015).
Letter Regarding Publication of Patent for Japanese Patent Application No. 2014-509509 (dated Aug. 5, 2015).
Letter Regarding Publication of Patent for Japanese Patent Application No. 2013-556857 (dated Aug. 5, 2015).
Letter Regarding Office Action for Japanese Patent Application No. 2013-556860 (dated Jul. 21, 2015).
Non-Final Office Action for U.S. Appl. No. 14/190,071 (dated Jul. 8, 2015).
Letter Regarding Publication of Patent for Japanese Patent Application No. 2013-556675 (dated Jun. 10, 2015).
Letter Regarding Notice of Grant for Japanese Patent Application No. 2014-509509 (dated Jun. 2, 2015).
Letter Regarding Notice of Grant for Japanese Patent Application No. 2013-556857 (dated May 26, 2015).
Notice of Allowance and Fee(s) Due and Examiner-Initiated Interview Summary for U.S. Appl. No. 13/465,552 (dated May 20, 2015).
Decision to Grant for Chinese Patent Application No. 201080065174.6 (dated Apr. 16, 2015).
Second Office Action for Japanese Patent Application No. 2013-556857 (dated Apr. 14, 2015).
Letter Regarding Notice of Grant for Japanese Patent Application No. 2013-556675 (dated Mar. 31, 2015).
Letter Regarding Office Action for Japanese Patent Application No. 2013-556855 (dated Feb. 24, 2015).
Notice of Allowance and Fee(s) Due and Examiner-Initiated Interview Summary for U.S. Appl. No. 13/192,410 (dated Feb. 12, 2015).
Applicant-Initiated Interview Summary for U.S. Appl. No. 13/465,552 (dated Feb. 9, 2015).
Notice of Panel Decision from Pre-Appeal Brief Review for U.S. Appl. No. 13/192,410 (dated Feb. 4, 2015).
Extended European Search Report for European Patent Application No. 12751986.6 (dated Jan. 20, 2015).
Non-Final Office Action for U.S. Appl. No. 13/748,547 (dated Jan. 5, 2015).
Supplemental Notice of Allowability for U.S. Appl. No. 13/366,928 (dated Dec. 26, 2014).
Non-Final Office Action for U.S. Appl. No. 13/465,552 (dated Oct. 17, 2014).
Letter Regarding Office Action for Japanese Patent Application No. 2013-556675 (dated Sep. 30, 2014).
Final Office Action for U.S. Appl. No. 13/192,410 (dated Sep. 25, 2014).
First Office Action for Japanese Application No. 2013-556857 (dated Sep. 24, 2014).

(56) References Cited

OTHER PUBLICATIONS

Notice of Allowance and Fee(s) Due for U.S. Appl. No. 13/366,928 (dated Sep. 3, 2014).
Extended European Search Report for European Application No. 12752952.7 (dated Aug. 27, 2014).
Notification of the First Office Action for Chinese Application No. 201080065174.6 (dated Aug. 13, 2014).
Extended European Search Report for European Application No. 12751783.7 (dated Jul. 22, 2014).
Extended European Search Report for European Application No. 12751812.4 (dated Jul. 16, 2014).
Notice of Allowance and Fee(s) Due for U.S. Appl. No. 13/409,893 (dated Jul. 10, 2014).
Notice of Allowance and Fee(s) Due for U.S. Appl. No. 13/409,914 (dated Apr. 25, 2014).
Supplemental Notice of Allowability for U.S. Appl. No. 13/409,949 (dated Apr. 24, 2014).
Notification of Transmittal of the International Search Report and the Written Opinion of the International Searching Authority, or the Declaration for International Patent Application No. PCT/US2014/011548 (dated Mar. 28, 2014).
Non-Final Office Action for U.S. Appl. No. 13/366,928 (dated Mar. 21, 2014).
Non-Final Office Action for U.S. Appl. No. 13/192,410 (dated Feb. 20, 2014).
Communication of European publication number and information on the application of Article 67(3) EPC for European Application No. 12781800.3 (dated Feb. 12, 2014).
Advisory Action Before the Filing of an Appeal Brief for U.S. Appl. No. 13/366,928 (dated Feb. 10, 2014).
Extended European Search Report for European Application No. 10841605.8 (dated Feb. 3, 2014).
Notice of Allowance and Fee(s) Due for U.S. Appl. No. 13/409,949 (dated Jan. 14, 2014).
Final Office Action for U.S. Appl. No. 13/409,914 (dated Dec. 30, 2013).
Notification of Publication and Entry into Examination Procedure for Chinese Patent Application No. 201280013938.6 (dated Dec. 18, 2013).
Communication of European publication number and information on the application of Article 67(3) EPC for European Application No. 12751986.6 (dated Dec. 11, 2013).
Communication of European publication number and information on the application of Article 67(3) EPC for European Application No. 12751783.7 (dated Dec. 11, 2013).
Communication of European publication number and information on the application of Article 67(3) EPC for European Application No. 12751812.4 (dated Dec. 11, 2013).
Communication of European publication number and information on the application of Article 67(3) EPC for European Application No. 12741984.4 (dated Nov. 13, 2013).
Declaration of Mark Kanode for U.S. Appl. No. 13/409,893 (dated Nov. 1, 2013).
Advisory Action for U.S. Appl. No. 13/192,410 (dated Oct. 24, 2013).
Final Office Action for U.S. Appl. No. 13/366,928 (dated Oct. 23, 2013).
Applicant-Initiated Interview Summary for U.S. Appl. No. 13/192,410 (dated Oct. 18, 2013).
Final Office Action for U.S. Appl. No. 13/409,949 (dated Sep. 19, 2013).
Advisory Action Before the Filing of an Appeal Brief for U.S. Appl. No. 13/409,893 (dated Sep. 13, 2013).
Notice of Allowance and Fee(s) Due for U.S. Appl. No. 12/974,869 (dated Aug. 19, 2013).
Final Office Action for U.S. Appl. No. 13/192,410 (dated Aug. 5, 2013).
Final Office Action for U.S. Appl. No. 13/409,893 (dated Jul. 1, 2013).

Non-Final Office Action for U.S. Appl. No. 13/409,914 (dated Jun. 7, 2013).
Notice of Allowance and Fee(s) Due for U.S. Appl. No. 13/412,352 (dated May 28, 2013).
Non-Final Office Action for U.S. Appl. No. 13/366,928 (dated Mar. 26, 2013).
Non-Final Office Action for U.S. Appl. No. 13/409,949 (dated Feb. 15, 2013).
Notice of Allowance and Fee(s) Due for U.S. Appl. No. 13/366,928 (dated Jan. 7, 2013).
Non-Final Office Action for U.S. Appl. No. 13/192,410 (dated Dec. 20, 2012).
Non-Final Office Action for U.S. Appl. No. 13/409,893 (dated Dec. 13, 2012).
Non-Final Official Action for U.S. Appl. No. 12/409,914 (dated Nov. 6, 2012).
Notification of Transmittal of the International Search Report and the Written Opinion of the International Searching Authority, or the Declaration for International Patent Application No. PCT/US2012/036784 (dated Nov. 1, 2012).
Non-Final Official Action for U.S. Appl. No. 13/412,352 (dated Oct. 26, 2012).
Communication of European publication number and information on the application of Article 67(3) EPC for European Patent Application No. 10841605.8 (dated Oct. 17, 2012).
Notification of Transmittal of the International Search Report and the Written Opinion of the International Searching Authority, or the Declaration for International Patent Application No. PCT/US2012/027281 (dated Jun. 15, 2012).
Notification of Transmittal of the International Search Report and the Written Opinion of the International Searching Authority, or the Declaration for International Application No. PCT/US2012/027263 (dated Jun. 14, 2012).
Notification of Transmittal of the International Search Report and the Written Opinion of the International Searching Authority, or the Declaration for International Patent Application No. PCT/US2012/027736 (dated Jun. 12, 2012).
Notification of Transmittal of the International Search Report and the Written Opinion of the International Searching Authority, or the Declaration for International Patent Application No. PCT/US2012/023971 (dated Jun. 11, 2012).
Notification of Transmittal of the International Search Report and the Written Opinion of the International Searching Authority, or the Declaration for International Patent Application No. PCT/US2012/027269 (dated Jun. 11, 2012).
"Multi-Protocol Routing Agent User's Guide," 910-6404-001 Revision A, Policy Management, Tekelec, pp. 1-70 (Jun. 2012).
Decision to grant a European patent pursuant to Article 97(1) EPC for European Application No. 05854512.0 (dated Mar. 15, 2012).
Communication under Rule 71(3) EPC for European application No. 05854512.0 (dated Nov. 11, 2011).
Notification of the Transmittal of the International Search Report and the Written Opinion of the International Searching Authority, or the Declaration for International Application No. PCT/US2010/061934 (dated Oct. 25, 2011).
Notice of Allowance and Fee(s) Due for U.S. Appl. No. 11/303,757 (dated May 11, 2011).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 10)," 3GPP TS 29.272, V10.2.0 pp. 1-95 (Mar. 2011).
3GPP, "3rd Generation Partnership Project; Technical Specification Group Services and System Aspects; Policy and Charging Control Architecture (Release 11)," 3GPP TS 23.203 V11.0.1, pp. 1-137 (Jan. 2011).
Official Action for U.S. Appl. No. 11/303,757 (dated Dec. 22, 2010).
3GPP, "3rd Generation Partnership Project; Technical Specification Group Core Network and Terminals; Sh Interface based on the Diameter protocol; Protocol details (Release 8)," 3GPP TS 29.329, V8.8.0 (Dec. 2010).
Communication pursuant to Article 94(3) EPC for European Application No. 05 854 512.0 (dated Oct. 12, 2010).

(56) References Cited

OTHER PUBLICATIONS

"Digital cellular telecommunications system (Phase 2+); Universal Mobile Telecommunications System (UMTS); LTE; IP Multimedia Subsystem (IMS); Stage 2 (3GPP TS 23.228 version 9.4.0 Release 9)," ETSI TS 123 228, V9.4.0 (Oct. 2010).
"Digital cellular telecommunications system (Phase 2+); Universal Mobile Telecommunications System (UMTS); LTE; End-to-end Quality of Service (QoS) concept and architecture (3GPP TS 23.207 version 9.0.0 Release 9)," ETSI TS 123 207, V9.0.0 (Oct. 2010).
"3rd Generation Partnership Project; Technical Specification Group Services and System Aspects; Telecommunication management; Charging management; Packet Switched (PS) domain charging (Release 9)," 3GPP TS 32.251, V9.4.0 (Oct. 2010).
"3rd Generation Partnership Project; Technical Specification Group Services and System Aspects; Telecommunication management; Charging management; Diameter charging applications (Release 9)," 3GPP TS 32.299, V9.4.0 (Jun. 2010).
"3rd Generation Partnership Project; Technical Specification Group Services and System Aspects; Telecommunication management; Charging management; Charging architecture and principles (Release 9)," 3GPP TS 32.240, V9.1.0 (Jun. 2010).
Znaty, "Diameter, GPRS, (LTE + ePC = EPS), IMS, PCC and SDM," EFORT, pp. 1-229 (Part 1 of 2) (May 2010).
Znaty, "Diameter, GPRS, (LTE + ePC = EPS), IMS, PCC and SDM," EFORT pp. 230-461 (Part 2 of 2) (May 2010).
3GPP, "3rd Generation Partnership Project; Technical Specification Group Core Network and Terminals; Policy and Charging Control signalling flows and Quality of Service (QoS) parameter mapping (Release 9)," 3rd Generation Partnership Project TS 29.213 V9.2.0 pp. 1-129 (Mar. 2010).
"3rd Generation Partnership Project; Technical Specification Group Core Network and Terminals; Policy and Charging Control over Gx reference point (Release 9)," 3GPP TS 29.212 V9.2.0 (Mar. 2010).
Communication pursuant to Article 94(3) EPC for European Application No. 05854512.0 (dated Feb. 8, 2010).
Final Official Action for U.S. Appl. No. 11/303,757 (dated Dec. 9, 2009).
"3rd Generation Partnership Project; Technical Specification Group Services and System Aspects; Policy and charging control architecture (Release 9)," 3GPP TS 23.203, V9.3.0 (Dec. 2009).
Supplementary European Search Report for European Application No. 05854512.0 (dated Nov. 17, 2009).
Official Action for U.S. Appl. No. 11/303,757 (dated May 28, 2009).
"Cisco Content Services Gateway—2nd Generation Release 3.5 Installation and Configuration Guide," Chapter 10: Configuring Gx Support, pp. 10-1-10-10, Chapter 11: Configuring Mobile PCC Support, pp. 11-1-11-8, URL: http://www.cisco.com/en/US/docs/wireless/csg2/3.5/installation/guide/csg3-51.pdf (Jun. 5, 2009).
3GPP, "3rd Generation Partnership Project; Technical Specification Group Core Network and Terminals; IP Multimedia (IM) Subsystem Sh interface; Signalling flows and message contents (Release 8)," 3GPP TS 29.328 V8.4.0, pp. 1-42 (Mar. 2009).
Final Official Action for U.S. Appl. No. 11/303,757 (dated Oct. 6, 2008).
Official Action for U.S. Appl. No. 11/303,757 (dated May 7, 2008).
Notification of Transmittal of the International Search Report and the Written Opinion corresponding to International Application No. PCT/US05/45813 (dated Mar. 24, 2008).
Official Action for U.S. Appl. No. 11/303,757 (dated Feb. 21, 2008).
Chiba et al., "Dynamic Authorization Extensions to Remote Authentication Dial in User Service (RADIUS)," RFC 5176, pp. 1-32 (Jan. 2008).
Restriction Requirement for U.S. Appl. No. 11/303,757 (dated Oct. 4, 2007).
"Tekelec Announces TekCore IMS Core Platform," (Jun. 5, 2006).
"Operator Guidebook to IMS and New Generation Networks and Services," www.morianagroup.com, Second Edition (Feb. 2006).
Liu et al., "IBM Technical Library, Introduction to Diameter," pp. 1-9, http://www.ibm.com/developerworks/wireless/library/wi-diameter (Jan. 24, 2006).

Rouse, "Platform," http://searchservervirtualization.techtarget.com/definition/platform, pp. 1-2 (2006-2009).
Camarillo et al., "The 3G IP Multimedia Subsystem (IMS), Merging the Internet and the Cellular Worlds," Second Edition (2006).
Hakala et al., "Diameter Credit-Control Application," RFC 4006, pp. 1-114 (Aug. 2005).
Calhoun et al., "Diameter Network Access Server Application," RFC 4005, pp. 1-85 (Aug. 2005).
Calhoun et al., "Diameter Mobile IPv4 Application," RFC 4004, pp. 1-53 (Aug. 2005).
"Operator Guidebook to IMS and New Generation Networks and Services," www.morianagroup.com, First Edition, pp. 1-450 (Aug. 2005) (Part 1 of 2).
"Operator Guidebook to IMS and New Generation Networks and Services," www.morianagroup.com, First Edition, pp. 451-934 (Aug. 2005) (Part 2 of 2).
Gonzalo et al., "The 3G IP Multimedia Subsystem," Chapter 3: General Principles of the IMS Architecture (Aug. 20, 2004).
"IP Multimedia Subsystem IMS Over and Applications," 3G Americas, pp. 1-17 (Jul. 2004).
"3rd Generation Partnership Project; technical Specification Group Core Network; IP Multimedia (IM) Session Handling; IM Call Model; Stage 2 (Release 6)," 3GPP TS 23.218, V6.1.0, pp. 1-56 (Mar. 2004).
"IMS Security Framework," 3GPP2 S.R0086-0, Version 1.0, pp. 1-39 (Dec. 11, 2003).
"IP Multimedia Subsystem—Accounting Information Flows and Protocol," 3GPP2 X.50013-008-0, Version 1.0, pp. 1-42 (Dec. 2003).
"Ip Multimedia Subsystem—Charging Architecture," 3GPP2 X.50013-007-0, Version 1.0, pp. 1-16 (Dec. 2003).
"All-IP Core Network Multimedia Domain," 3rd Generation Partnerships Project 2 (3GPP2), 3GPP2 X.50013-000-0, Version 1.0, pp. i-ii and 1-14 (Dec. 2003).
"3rd Generation Partnership Project; Technical Specification Group Core Network; Cx and Dx Interfaces Based on the Diameter Protocol; Protocol Details (Release 5)," 3GPP TS 29.229, V5.6.0, pp. 1-23 (Dec. 2003).
"Digital Cellular Telecommunications System (Phase 2+); Universal Mobile Telecommunications System (UMTS); IP Multimedia Subsystem (IMS); Stage 2 (Release 5)," 3GPP TS 23.228, V5.7.0, pp. 1-130 (Dec. 2002).
Olson et al., "Support for IPv6 in Session Description Protocol (SDP)," RFC 3266, pp. 1-5 (Jun. 2002).
Rosenberg et al., "SIP: Session Initiation Protocol," RFC 3261, pp. 1-252 (Jun. 2002).
Howard, "Sipping IETF51 3GPP Security and Authentication," http://www3.ietf.org/proceedings/01aug/slides/sipping-7/index.htm (Dowloaded from Internet on Dec. 16, 2005) (Sep. 13, 2001).
Calhoun et al., "Diameter Base Protocol,"draft-ietf-aaa-diameter-07, Section 6.3, p. 68 (Jul. 2001).
Narten et al., "Privacy Extensions for Stateless Address Autoconfiguration in IPv6," RFC 3041, pp. 1-16 (Jan. 2001).
Faltstrom, "E.164 Number and DNS," RFC 2916, pp. 1-10 (Sep. 2000).
Rigney et al., "Remote Authentication Dial in User Service (RADIUS)," RFC 2865, pp. 1-70 (Jun. 2000).
Vaha-Sipila, "URLs for Telephone Calls," RFC 2806, pp. 1-20 (Apr. 2000).
Aboba et al., "The Network Access Identifier," RFC 2486, pp. 1-8 (Jan. 1999).
Calhoun et al., "Diameter Proxy Server Extensions," IETF Working Draft, draft-calhoun-diameter-proxy-01.txt (Aug. 1, 1998).
Berners-Lee et al., "Uniform Resource Identifiers (URI): Generic Syntax," RFC 2396, pp. 1-38 (Aug. 1998).
Tekelec, "Eagle® Feature Guide," P/N 910-1225-01 (Jan. 1998).
Jalava, "Service Routing in 3GPP IP Multimedia Subsystem," Nokia, pp. 1-16 (Publication Date Unknown).
Intent to Grant for European Patent Application No. 10841605.8 (dated Aug. 12, 2016).
Letter Regarding Office Action for Japanese Patent Application No. 2015-553784 (dated Jul. 19, 2016).

(56) References Cited

OTHER PUBLICATIONS

Letter Regarding Notice of Grant for Chinese Patent Application No. ZL201280018297.3 (dated Jul. 4, 2016).
Commonly-assigned, co-pending U.S. Appl. No. 14/929,283 for "Methods, Systems, and Computer Readable Media for Remote Access Dial in User Service (RADIUS) Proxy and Diameter Agent Address Resolution," (Unpublished, filed Oct. 31, 2015).
Commonly-assigned, co-pending U.S. Appl. No. 14/826,289 for "Methods, Systems, and Computer Readable Media for Providing Access Network Session Correlation for Policy Control," (Unpublished, filed Aug 14. 2015).
Commonly-assigned, co-pending U.S. Appl. No. 14/827,015 for "Methods, Systems, and Computer Readable Media for Providing Access Network Protocol Interworking and Authentication Proxying," (Unpublished, filed Aug. 14, 2015).
Commonly-assigned, co-pending U.S. Appl. No. 14/827,025 for "Methods, Systems, and Computer Readable Media for Providing Access Network Signaling Protocol Intel-working for User Authentication," (Unpublished, filed Aug. 14, 2015).
Fajardo et al., "Diameter Base Protocol," RFC 6733, pp. 1-152 (Oct. 2012).
"Traffix Signaling Delivery Controller—One Platform to Deliver the Wonders of 4G," Traffix Systems, The Diameter Control Plane Experts, pp. 1-7 (2011).
"Traffix Signaling Delivery Controller (SDC)," Traffix Systems, The Diameter Control Plane Experts, pp. 1-5 (2011).
"Traffix Signaling Delivery Controller (SDC) Diameter Gateway—Use Case Development Scenarios," Traffix Systems, The Diameter Control Plane Experts, www.traffixsystems.com pp. 1-4 (2011).
"Traffix Signaling Delivery Controller Diameter Load Balancer: Scalability for your Control Plane," Traffix Systems, The Diameter Control Plane Experts, www.traffixsystems.com pp. 1-3 (2011).
Gundavelli et al., "Network Mobility (NEMO) Management information Base," RFC 5488, pp. 1-44 (Apr. 2009).
Arkko et al., "Extensible Authentication Protocol Method for 3rd Generation Authentication and Key Agreement (EAP-AKA)," RFC 4187, pp. 1-79 (Jan. 2006).
Haverinen et al., "Extensible Authentication Protocol Method for Global System for Mobile Communications (GSM) Subscriber Identity Modules (EAP-SIM)," RFC 4186, pp. 1-80 (Jan. 2006).
Aboba et al., "Extensible Authentication Protocol (EAP)," RFC 3748, pp. 1-67 (Jun. 2004).
Calhoun et al., "Diameter Base Protocol," RFC 3588, pp. 1-147 (Sep. 2003).
Aboba et al., "RADIUS (Remote Authentication Dial in User Service) Support for Extensible Authentication Protocol (EAP)," RFC 3579, pp. 1-46 (Sep. 2003).
"ITP Operations Manual," Cisco Systems, Inc., pp. 1-320 (May 1, 2002).
"Configuring ITP Optional Features" IP Transfer Point, Cisco Systems, Inc., pp. 29-76 (2001).
"Cisco IP Transfer Point Q & A," Cisco Systems, Inc., pp. 1-15 (1992-2001).
Rigney et al., "RADIUS Accounting," RFC 2366, pp. 1-28 (Jun. 2000).
Letter Regarding Decision to Grant a Chinese Patent for Chinese Patent Application No. No. ZL201280019607.3 (dated Oct. 10, 2016).
Notification of the Second Office Action for Chinese Patent Application No. 201280013938.6 (dated Oct. 9, 2016).
Notification of the Second Office Action for Chinese Patent Application No. 201280018288.4 (dated Sep. 5, 2016).
Communication under Rule 71(3) EPC for European Patent Application No. 12 751 812.4 (dated Sep. 2, 2016).
Non-Final Office Action for U.S. Appl. No. 14/827,025 (dated Aug. 26, 2016).
Decision to grant a European patent pursuant to Article 97(1) EPC for European Patent Applicaton No. 12751986.6 (dated Aug. 19, 2016).
Communication pursuant to Article 94(3) EPC for European Application No. 12 751 783.7 (dated Mar. 15, 2017).
Notice of Allowance and Fee(s) Due for U.S. Appl. No. 14/827,015 (dated Mar. 10, 2017).
Letter Regarding Decision to Grant for Chinese Application No. ZL201280018288.4 (dated Feb. 14, 2017).
Letter Regarding Decision to Grant for Chinese Application No. ZL201280013938.6 (dated Feb. 3, 2017).
Non-Final Office Action for U.S. Appl. No. 14/742,679 (dated Feb. 2, 2017).
Notice of Allowance and Fee(s) Due for U.S. Appl. No. 14/827,025 (dated Jan. 20, 2017).
Letter Regarding Notice of Grant for Japanese Patent Application No. 2015-553784 (dated Jan. 24, 2017).
Letter Regarding Decision to Grant for Chinese Patent Application No. ZL201280018298.8 (dated Jan. 10, 2017).
Extended European Search Report for European Patent Application No. 12741984.4 (dated Dec. 20, 2016).
Applicant-Initiated Interview Summary for U.S. Appl. No. 14/827,025 (dated Dec. 13, 2016).
Decision to grant a European patent pursuant to Article 97(1) EPC for European Patent Application No. 12751812.4 (dated Nov. 24, 2016).
Non-Final Office Action for U.S. Appl. No. 14/827,015 (dated Oct. 31, 2016).
Decision to grant a European patent pursuant to Article 97(1) EPC for European Patent Application No. 10841605.8 (dated Oct. 27, 2016).
Non-Final Office Action for U.S. Appl. No. 14/826,289 (dated May 1, 2017).
Commonly-assigned, co-pending U.S. Divisional U.S. Appl. No. 15/582,591 for "Methods, Systems, and Computer Readable Media for Providing Access Network Protocol Interworking and Authentication Proxying," (Unpublished, filed Apr. 28, 2017).
Commonly-assigned, co-pending U.S. Divisional U.S. Appl. No. 15/582,503 for "Methods, Systems, and Computer Readable Media for Providing Access Network Signaling Protocol Interworking for User Authentication," (Unpublished, filed Apr. 28, 2017).
Advisory Action Before the Filing of an Appeal Brief, Examiner-Initiated Interview Summary, and AFCP 2.0 Decision for U.S. Appl. No. 14/742,679 (dated Sep. 22, 2017).
Non-Final Office Action for U.S. Appl. No. 14/929,283 (dated Aug. 30, 2017).
Applicant Initiated Interview Summary for U.S. Appl. No. 14/826,289 (dated Jul. 27, 2017).
Non-Final Office Action for U.S. Appl. No. 15/582,503 (dated Jun. 30, 2017).
Non-Final Office Action for U.S. Appl. No. 15/582,591 (dated Jun. 30, 2017).
Final Office Action for U.S. Appl. No. 14/742,679 (dated Jun. 30, 2017).
Notice of Allowance and Fee(s) Due and Applicant-Initiated Interview Summary for U.S. Appl. No. 15/582,503 (dated Oct. 26, 2017).

* cited by examiner

METHODS, SYSTEMS, AND COMPUTER READABLE MEDIA FOR REMOTE AUTHENTICATION DIAL IN USER SERVICE (RADIUS) MESSAGE LOOP DETECTION AND MITIGATION

TECHNICAL FIELD

The subject matter described herein relates to detecting and reducing the occurrence of message loops in RADIUS networks. More particularly, the subject matter described herein relates to methods, systems, and computer readable media for RADIUS message loop detection and mitigation.

BACKGROUND

In computer networks, a message loop occurs when a message is continually forwarded among network nodes without being terminated. For example, a network may have three nodes, node A, node B, and node C. Node A may originate a message intended for a node outside of the network but reachable by node C. Node A forwards the message to node B, which forwards the message to node C. However, rather than forwarding the message to the destination, node C may erroneously forward the message back to node A, and the message may continually loop between nodes A, B, and C.

Message looping can be caused by route table misconfiguration and/or network conditions, such as link congestion or link outages. In the preceding example misconfiguration of the route table in node C may be the cause of the message looping. Alternatively, a link outage between node C and the destination may cause node C to forward the message back to node A.

Some network protocols include mechanisms for detecting and preventing message loops. For example, the Diameter protocol uses a route record attribute value pair (AVP) for each node to record its identity in a Diameter signaling message that it receives and forwards. The route record AVP is also used as a looping check for inbound messages. For example, when a node receives a Diameter signaling message, the node checks the route record AVP. If the node sees its own identifier in the route record AVP, this means that the node has previously received and processed the message and a loop may be indicated.

While protocols such as Diameter include mechanisms for detecting and preventing Diameter message looping, other protocols, such as RADIUS, do not include loop detection or prevention. As a result, RADIUS messages can loop in a network without being detected or prevented, resulting in wasting of network resources. Accordingly, there exists a need for methods, systems, and computer readable media for RADIUS message loop detection and mitigation.

SUMMARY

Methods, systems, and computer readable media for RADIUS message loop detection and mitigation are disclosed. One method includes receiving, at a RADIUS proxy node, a RADIUS signaling message. The method further includes determining whether the RADIUS signaling message includes an attribute with a host identifier corresponding to the RADIUS proxy node. In response to determining that the RADIUS signaling message includes the attribute that includes the host identifier corresponding to the RADIUS proxy node, performing a RADIUS loop mitigation action for the RADIUS signaling message.

According to another aspect of the subject matter described herein, a system for RADIUS message loop detection and mitigation is disclosed. The system includes a RADIUS proxy node. The RADIUS proxy node includes a RADIUS connection layer for receiving a RADIUS signaling message. The system further includes a RADIUS loop mitigator for determining whether the RADIUS signaling message includes an attribute having a host identifier corresponding to the RADIUS proxy node and in response to determining that the RADIUS signaling message includes the attribute with the host identifier corresponding to the RADIUS proxy node, performing a RADIUS loop mitigation action for the RADIUS signaling message.

According to another aspect of the subject matter described herein, the system for RADIUS message loop detection and mitigation includes a DSR, and the RADIUS proxy node is a component of the DSR.

According to another aspect of the subject matter described herein, the DSR receives a Diameter message, identifies a corresponding outbound message as a RADIUS message, and performs loop mitigation for the Diameter message and the outbound RADIUS message.

According to another aspect of the subject matter described herein, the RADIUS proxy node comprises a standalone RADIUS proxy that provides RADIUS proxy services.

According to another aspect of the subject matter described herein, the RADIUS proxy node comprises a RADIUS connection layer, and the RADIUS loop mitigator, which determines whether the RADIUS signaling message includes the attribute with the host identifier corresponding to the RADIUS proxy node, is implemented in the RADIUS connection layer.

According to another aspect of the subject matter described herein, the RADIUS loop mitigator is configured to perform the RADIUS loop mitigation by discarding the RADIUS signaling message.

According to another aspect of the subject matter described herein, the RADIUS loop mitigator is configured to, in response to determining that the RADIUS signaling message includes the attribute with the host identifier corresponding to the RADIUS proxy node, generate an operations, administration, and maintenance (OAM) event.

According to another aspect of the subject matter described herein, the RADIUS loop mitigator is configured to, in response to determining that the RADIUS signaling message does not include the attribute with the host identifier corresponding to the RADIUS proxy node, insert the host identifier of the RADIUS proxy node and the attribute of the RADIUS signaling message.

According to another aspect of the subject matter described herein, the RADIUS loop mitigator is configured to, in response to determining that the RADIUS signaling message does not include the predetermined attribute with the host identifier of the RADIUS proxy node, insert a host identifier for a peer that forwarded the RADIUS proxy node to the RADIUS proxy node in the predetermined attribute of the RADIUS signaling message.

According to another aspect of the subject matter described herein, the attribute in the RADIUS message used to carry RADIUS loop detection information is a proxy state attribute of the RADIUS signaling message.

According to another aspect of the subject matter described herein, the attribute used to carry RADIUS and/or Diameter loop detection information is a Diameter route record attribute value pair of a Diameter envelope that carries the RADIUS signaling message.

According to another aspect of the subject matter described herein, the RADIUS proxy node or a DSR that includes the RADIUS proxy node is configured to identify a peer to which the RADIUS signaling message should be routed.

According to another aspect of the subject matter described herein, the RADIUS loop mitigator is configured to determine whether the attribute in the RADIUS signaling message includes an identifier corresponding to the peer to which the RADIUS signaling message should be routed.

According to another aspect of the subject matter described herein, the RADIUS loop mitigator is configured to, in response to determining that the attribute contains an identifier before the peer to which the RADIUS signaling message should be routed, perform a RADIUS loop mitigation action.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
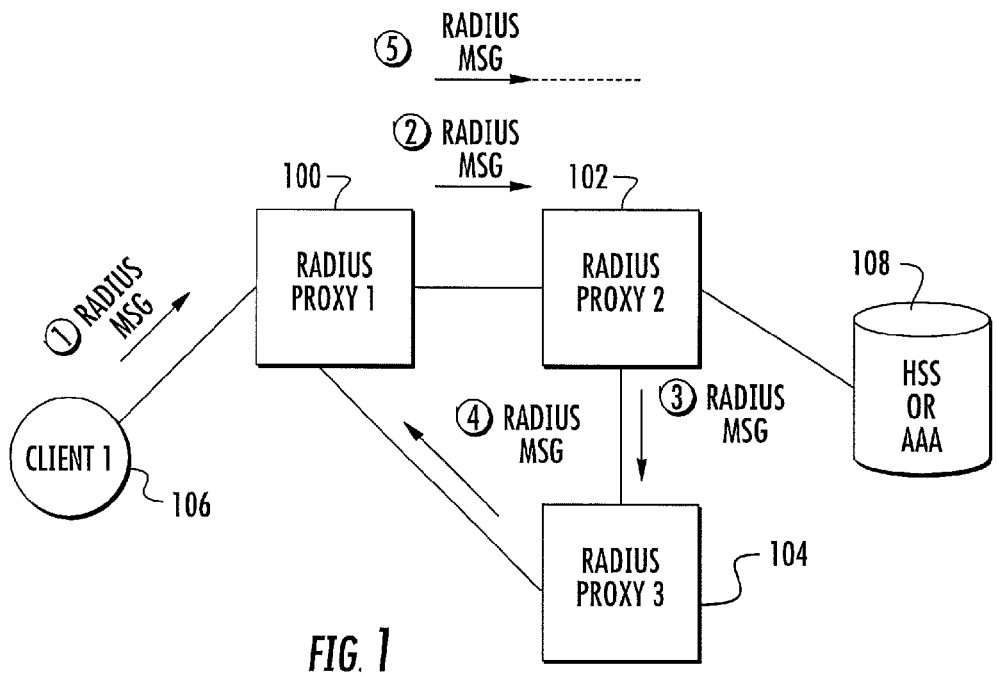
FIG. 1 is a network diagram illustrating looping of RADIUS messages.
Figure 2:
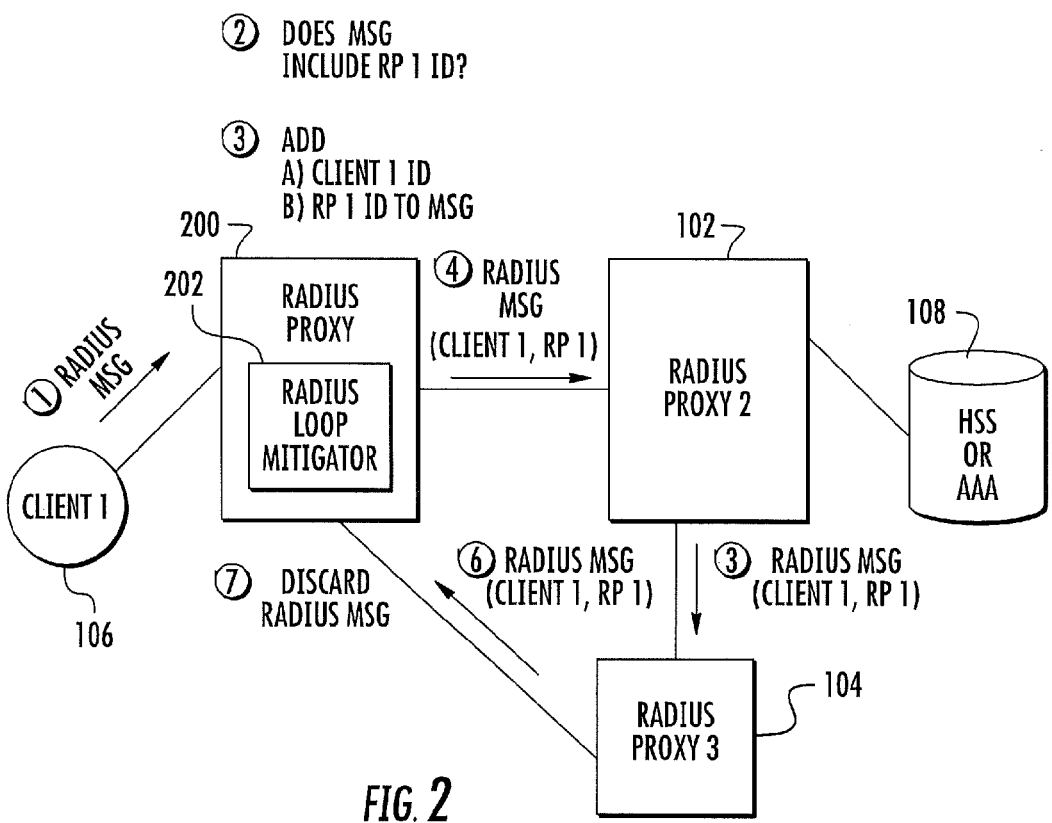
FIG. 2 is a network diagram illustrating RADIUS message loop mitigation according to an aspect of the subject matter described herein.

As stated above, loops can occur in RADIUS networks because RADIUS messages do not carry route records like Diameter messages and RADIUS nodes do not check for message loops. FIG. 1 is a network diagram illustrating an example of message looping in a RADIUS network. In FIG. 1, RADIUS proxies 100, 102, and 104 forward RADIUS messages between an accounting or authentication client 106 and a home subscriber server (HSS) or MA server 108. A RADIUS proxy is a node that forwards RADIUS messages between other nodes. client 106 performs signaling functions on behalf of user equipment (UEs) in an access network. Two examples of signaling functions performed by client 106 are authentication and accounting signaling. Accounting signaling includes signaling relating to charging for access to network services. Authentication signaling includes signaling relating to authenticating UEs to an access network. In FIG. 2, client 106 sends accounting or authentication messages to HSS or AAA server 108. HSS or AAA server 108 contains subscriber records relating to mobility and authentication and responds to the messages using the information stored in the subscription records. For example, in an authentication scenario, a UE may request and receive access challenge information from an AAA server. RADIUS and/or Diameter messages may be used to carry the access challenge information, depending on the protocols implemented by the AAA server and the access network equipment. As will be described in detail below, a RADIUS proxy and/or a DSR configured with a RADIUS loop mitigation may detect and reduce the occurrence of loops of any RADIUS Diameter message, including RADIUS or Diameter messages relating to authentication and accounting. In one example, authentication or accounting client 106 may be a packet data network gateway, a broadband network gateway, a WLAN gateway, or a wireless access point In the illustrated example, client 106 sends a RADIUS message to RADIUS proxy 100. RADIUS proxy 100 determines that the message should be forwarded to one of its peers, which in the illustrated example, is RADIUS proxy 102. Accordingly, RADIUS proxy 100 forwards the RADIUS message to RADIUS proxy 102. It is assumed that no checking for message loops or a modification of the outbound message is performed. It is also assumed that the route table of RADIUS proxy 102 is misconfigured such that instead of forwarding the RADIUS message over the link to HSS or AAA server 108, RADIUS proxy 102 forwards the RADIUS message to RADIUS proxy 104. Because the link between RADIUS proxy 104 and HSS or AAA server 108 is down, RADIUS proxy 104 also erroneously forwards the RADIUS message to RADIUS proxy 100.

RADIUS proxy 100 has already processed the message, but because RADIUS does not include a mechanism for loop detection, RADIUS proxy 100 again forwards the RADIUS message to RADIUS proxy 102. The RADIUS message may continue to loop through the network and waste network resources. The looping may continue until the route table of RADIUS proxy 102 is corrected and/or the link outage between RADIUS proxy 104 and HSS or AAA server 108 is resolved.

In order to avoid at least some of the difficulties illustrated in FIG. 1, FIG. 2 illustrates a RADIUS proxy with a RADIUS loop mitigator according to an aspect of the subject matter described herein. Referring to FIG. 2, RADIUS proxy 200 includes a RADIUS loop mitigator 202 that performs functions for RADIUS loop detection and mitigation. It is assumed in this example that RADIUS proxies 102 and 104 do not include RADIUS loop mitigation.

In FIG. 2, when client 106 sends a RADIUS message to RADIUS proxy 200. The message may be an authentication message, an accounting message, or other type of RADIUS message. RADIUS loop mitigator 202 examines the RADIUS message to determine whether the RADIUS message includes an attribute that stores the host identifier of RADIUS proxy 200. If the message includes the attribute with the host identifier of RADIUS proxy 200, then RADIUS proxy 200 has previously processed and forwarded the message, and a loop is indicated. Therefore, RADIUS loop mitigator 202 may discard the RADIUS message.

However, at this point, the RADIUS message does not yet include the attribute with the host identifier for RADIUS proxy 200, because RADIUS proxy 200 is processing the message for the first time. RADIUS proxy 200 determines using its route table that the message should be forwarded to peer RADIUS proxy 102. Alternatively, a Diameter routing layer associated with RADIUS proxy may determine or identify the next hop peer for the RADIUS message. Before forwarding the RADIUS message to peer RADIUS proxy 102, RADIUS proxy 200 inserts its own host identifier into an attribute of the RADIUS message.

The attribute may be any suitable attribute that is usable to store information and communicate that information to other RADIUS nodes, but that is preferably not overwritten by the other RADIUS nodes. In one example, the attribute may be the RADIUS proxy state attribute. The RADIUS proxy state attribute is defined in IETF RFC 2865, Remote Authentication Dial In User Service (RADIUS), June 2000, the disclosure of which is incorporated herein by reference in its entirety. According to IETF RFC 2865, the proxy state attribute may be included in request messages forwarded by a forwarding RADIUS proxy. A forwarding RADIUS proxy may insert its own proxy state attribute in a RADIUS message. IETF RFC 2865 does not specify content for the RADIUS proxy state attribute, other than defining the format for the attribute and specifying the content as "application specific." IETF RFC 2865 also does not specify actions performed by receiving RADIUS proxies responsive to proxy state attributes in received RADIUS messages, other than stating that:

1. The attribute is available to be sent via proxy server to another proxy server when forwarding an access request and must be returned unmodified in the access accept, access reject, or access challenge.
2. When a proxy server receives the response to its request, it must remove its own proxy state (the last proxy state in the packet) before forwarding the response to the network access server.
3. If the proxy state attribute is added to a packet when forwarding the packet, the proxy state attribute must be added after any existing proxy state attributes.
4. The content of any proxy state other than the one added by the current server should be treated as opaque octets and must not affect the operation of the protocol.
5. Usage of the proxy state attribute is implementation dependent.

The above quoted conditions from the RADIUS RFC specify processing rules for the proxy state attribute. Rule number 3 makes the proxy state attribute well suited for carrying loop detection information, as each node that forwards a message can add its own identity to the end of a list of other nodes that have previously forwarded a message.

According to one exemplary implementation of the subject matter described herein, the RADIUS proxy state attribute may be used to carry host identifier information for each host that originates or forwards a RADIUS message so that the information can be used by receiving RADIUS proxies for loop detection and mitigation.

In addition to inserting its own host identifier in the RADIUS message before forwarding the RADIUS message, RADIUS loop mitigator 202 may also insert a host identifier for the message peer that forwarded the message to RADIUS proxy 200 in the RADIUS message. In FIG. 2, client 106 forwards the RADIUS message to RADIUS proxy 200. As a result, RADIUS loop mitigator 202 may insert the host identifier for client 106 in the RADIUS message before forwarding the RADIUS message to RADIUS proxy 102. In the illustrated example, the RADIUS message from RADIUS proxy 200 includes the host identifiers CLIENT1 and RP1, which respectively represent the host names of client 106 and RADIUS proxy 200.

Inserting the host identifier of the node that forwarded a RADIUS message to RADIUS proxy 200 in an outbound message from RADIUS proxy 200 further increases the likelihood of loop detection and mitigation. For example, in FIG. 2, if client 106 does not implement loop detection or prevention and RADIUS proxy 200 receives a message that is destined for client 106 but that includes a proxy state attribute with a host identifier of client 106, RADIUS proxy 200 may discard the message before forwarding the message to client 106.

Continuing with the example in FIG. 2, RADIUS proxy 102 receives the RADIUS message from RADIUS proxy 200. RADIUS proxy 102 does not include any loop detection or mitigation functionality. As a result, RADIUS proxy 102 may forward the RADIUS message with the RADIUS proxy state attribute unmodified to RADIUS proxy 104. It is assumed that the route table of RADIUS proxy 102 is misconfigured in the same manner illustrated in FIG. 1. Similarly, it is assumed that RADIUS proxy 104 also incorrectly forwards the RADIUS message on the link back to RADIUS proxy 200.

RADIUS proxy 200 receives the looped RADIUS message transmitted from RADIUS proxy 104. However, rather than forwarding the looped message, RADIUS proxy 200 determines whether the RADIUS message includes the attribute with the host identifier of RADIUS proxy 200. In this example, proxy state attribute of the RADIUS message includes the identifier for RADIUS proxy 200 that was inserted in the message by RADIUS proxy 200. Accordingly, RADIUS loop mitigator 202 may determine that the message is a looped message, discard the message, and perform an OAM action, such as incrementing a counter for the looped message.

Figure 3:
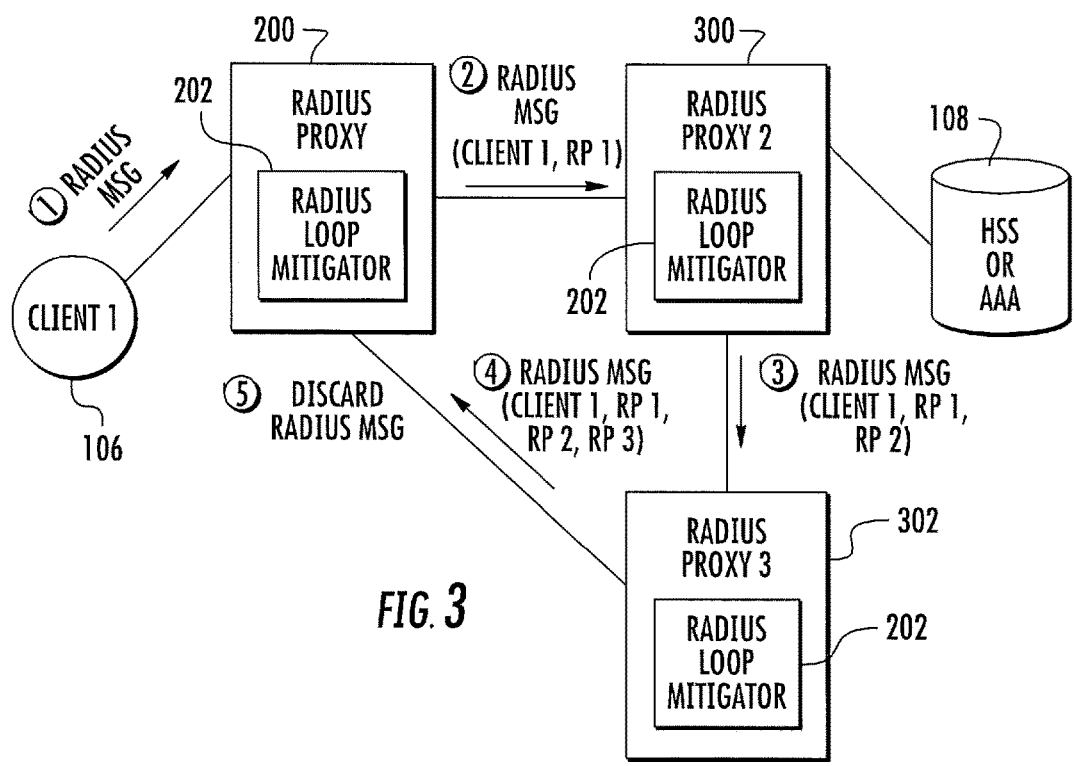
FIG. 3 is a network diagram illustrating the insertion of host identifiers in RADIUS messages that are usable to detect and reduce the occurrence of RADIUS message loops according to an aspect of the subject matter described herein.

FIG. 3 is network diagram similar to FIG. 2 except that in FIG. 3 it is assumed that each of RADIUS proxy 200, 300, and 302 includes a RADIUS loop mitigator 202. In the illustrated example, client 106 sends a RADIUS message to RADIUS proxy 200. RADIUS proxy 200 inserts the host identifiers for client 106 and RADIUS proxy 200 in the message. RADIUS proxy 200 forwards the RADIUS message to RADIUS proxy 300. Because RADIUS proxy 300 also includes RADIUS loop mitigator 202, RADIUS proxy 300 inserts its host identifier in the message and forwards the message to RADIUS proxy 302. RADIUS proxy 302 inserts its host identifier in the message and forwards the message (incorrectly) back to RADIUS proxy 200. The message forwarded back to RADIUS proxy 200 includes the identifiers of each node configured with RADIUS loop mitigation in the original message path. RADIUS proxy 200 receives the message, detects its own identifier in the message, and identifies the message as a looped message. Accordingly, RADIUS proxy 200 may discard the message and trigger an OAM action, such as incrementing a counter for looped messages.

Figure 4:
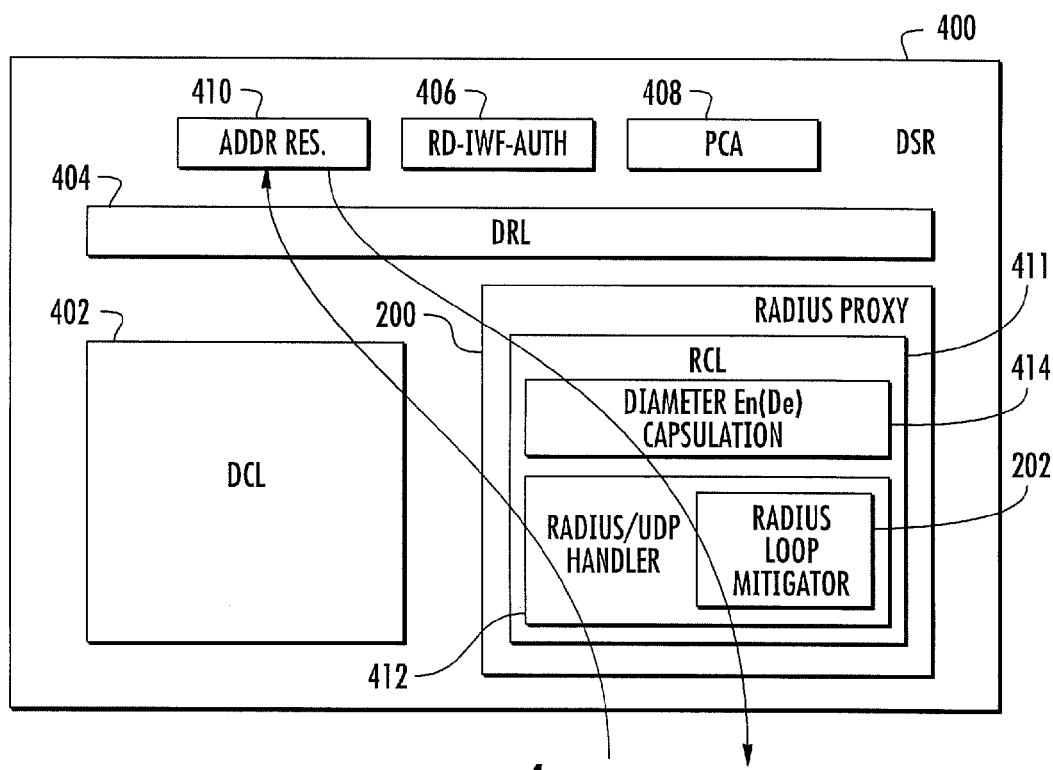
FIG. 4 is a block diagram illustrating an exemplary internal architecture for a Diameter signaling router (DSR) that includes a RADIUS proxy according to an aspect of the subject matter described herein.

In one aspect of the subject matter described herein, RADIUS proxy 200 may be a component of a DSR. FIG. 4 illustrates such an example. In FIG. 4, DSR 400 includes RADIUS proxy 200 with RADIUS loop mitigator 202. DSR 400 also includes a Diameter connection layer (DCL) 402 for sending and receiving Diameter messages, a Diameter routing layer (DRL) 404 for routing Diameter messages based on Diameter layer information in the messages, a RADIUS-Diameter interworking function for authentication (RD-IWF-AUTH) 406 that performs interworking between RADIUS and Diameter protocols to support authentication functions, a policy and charging application (PCA) 408 that supports session-stateful routing for RADIUS and Diameter policy and charging messages, and an address resolution module 410 for translating subscriber identifiers into routable network addresses.

In the illustrated example, RADIUS proxy 200 includes a RADIUS connection layer 411 that processes incoming and outbound RADIUS messages. RADIUS connection layer 411 is divided into RADIUS/UDP handler 412, that receives inbound UDP-encapsulated RADIUS messages and removes the RADIUS messages from UDP datagrams. For outbound RADIUS messages, RADIUS/UDP message handler 412 may encapsulate the RADIUS messages in UDP datagrams. In the illustrated example, RADIUS/UDP message handler 412 also includes RADIUS loop mitigator 202, which performs the RADIUS loop detection and mitigation steps described herein. RADIUS loop mitigator 202 may also insert the loop detection attributes in outbound RADIUS messages.

Diameter encapsulation/de-encapsulation module 414 encapsulates inbound RADIUS messages in Diameter envelopes so that the messages can be routed by Diameter routing layer 404 and processed by applications 406, 408, and 410. For outbound RADIUS messages, Diameter encapsulation/de-encapsulation module 414 may remove the Diameter envelope so that the RADIUS messages can be processed by peer RADIUS nodes that lack Diameter functionality.

In FIG. 4, the curved arrows represent an inbound RADIUS message and an outbound RADIUS message, respectively. On the inbound side, RADIUS loop mitigator 202 may determine whether the message includes a host identifier of RADIUS proxy 200 and/or DSR 400. If such an identifier is present, RADIUS proxy 200 may identify the message as a looped message and discard the message. Assuming the message passes the inbound loop detection screening, RADIUS loop mitigator 202 inserts the host identifier of RADIUS proxy 200 and the identifier of the node that forwarded the message to RADIUS proxy 200 in the proxy state attribute of the message. The message is forwarded to DRL 404 after being encapsulated in a Diameter envelope by Diameter encapsulation/de-encapsulation module 414.

DRL 404 determines that the message requires processing by RD-address resolution module 410, Address resolution module 410 translates a subscriber identifier in the message into a routable address for HSS or AAA server 108, inserts a host identifier for HSS or AAA server 108 in the destination host field of the Diameter message, and forwards the message to DRL 404. DRL 404 reads the destination host parameter in the message, performs a lookup in a Diameter route database using the destination host parameter, determines that the message should be forward to HSS or AAA server 108 via the interface associated with RADIUS proxy 200, and forwards the message back to RADIUS proxy 200. Diameter encapsulation/de-encapsulation module 414 removes the Diameter envelope since the outbound message is to be a RADIUS message. RADIUS loop mitigator 202 determines whether the host identifier of the next hop peer is present in the proxy state attribute of the outbound message, and, if so, discards the message as being a looped message.

Assuming the message passes outbound loop detection screening, RADIUS/UDP handler 412 encapsulates the RADIUS message in a UDP datagram and forwards the RADIUS message with a modified list of proxy state attributes to a next hop RADIUS peer, which may utilize the attributes to perform loop detection and mitigation. In FIG. 3, the next hop RADIUS peer is RADIUS proxy 300, which implements RADIUS loop detection mitigation, performs a similar process to that described with respect to FIG. 4, and forwards the message to the next hop or the destination. The process continues until a loop is detected and the message is discarded or the message reaches the destination.

In the example illustrated in FIG. 4, RADIUS proxy 200 is a component of DSR 400. In an alternate implementation, RADIUS proxy 200 may be a standalone entity that implements RADIUS proxy and RADIUS message loop mitigation functions without also implementing Diameter functions.

Figure 5A:
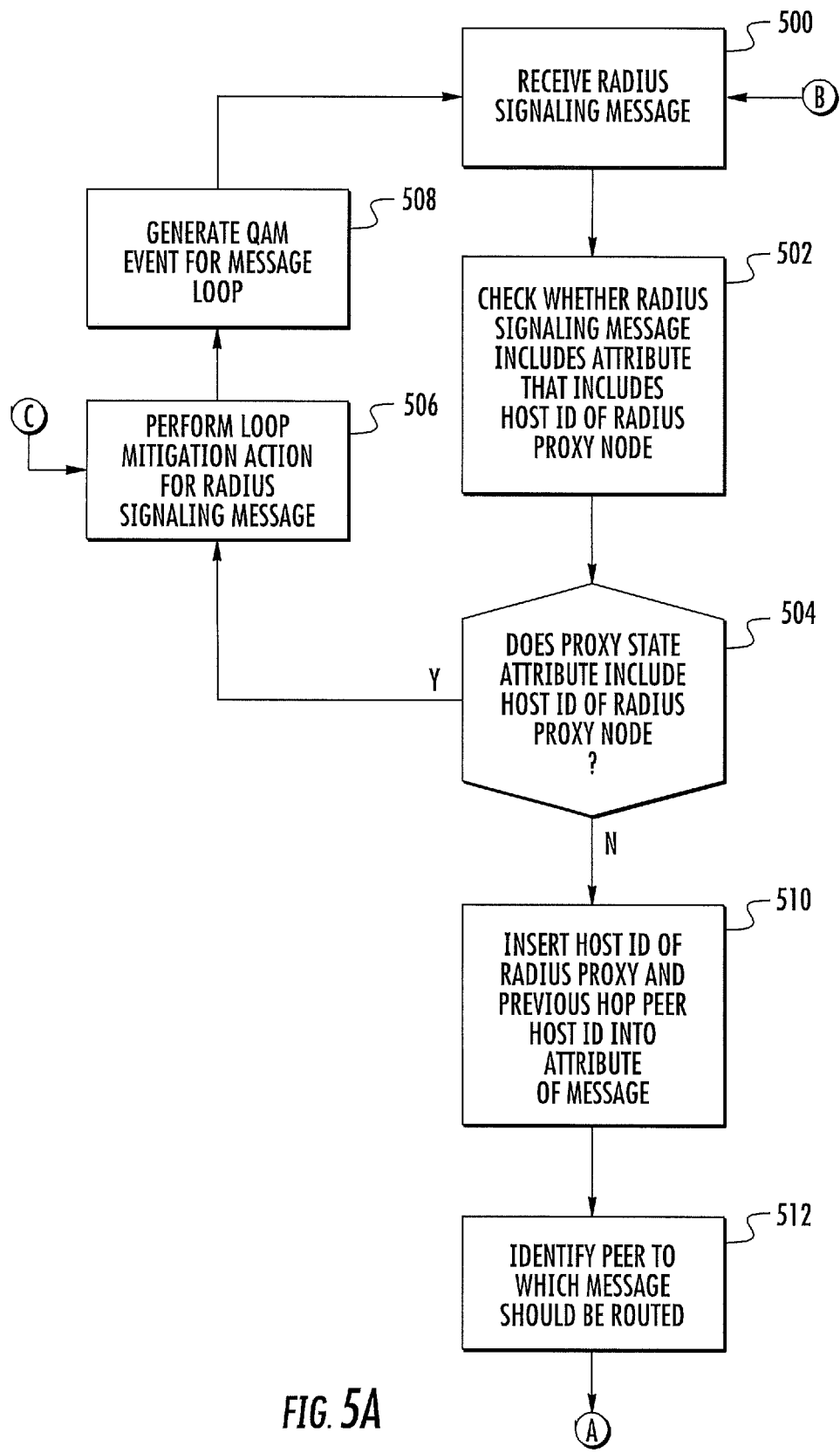
FIGS. 5A and 5B are a flow chart illustrating exemplary RADIUS loop mitigation steps for an incoming RADIUS message and an outgoing RADIUS message according to an aspect of the subject matter described herein.
Figure 5B:
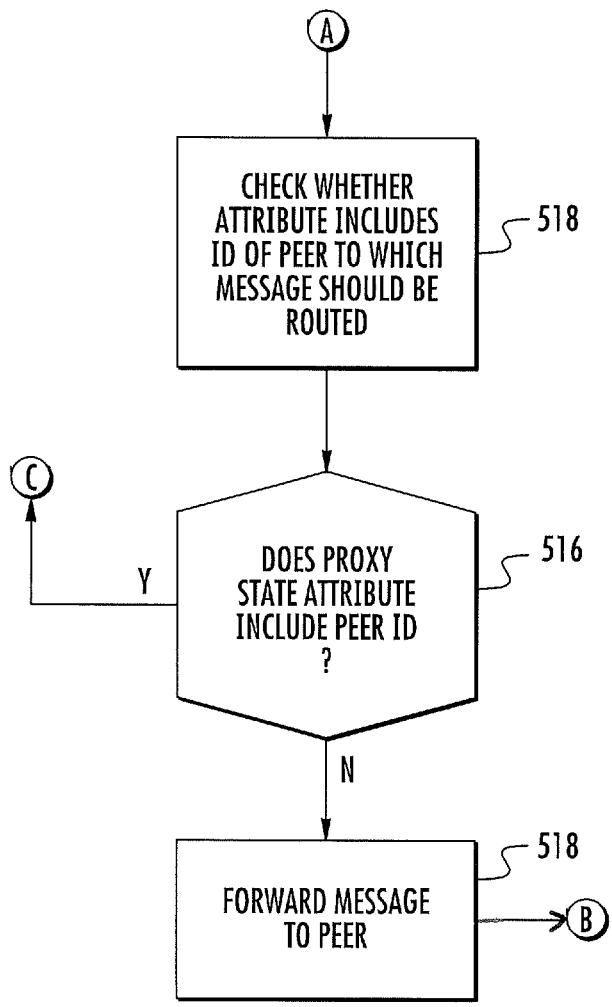

FIGS. 5A and 5B are a flow chart illustrating exemplary steps performed in performing RADIUS loop mitigation when the inbound and outbound messages are RADIUS messages and the proxy state attribute is used to carry the RADIUS loop mitigation information. Referring to FIG. 5A, in step 500, a RADIUS signaling message is received. For example, a RADIUS message may be received by RADIUS proxy 200 (either as a component of a DSR or as a standalone entity.)

In steps 502 and 504, it is determined whether the RADIUS message includes an attribute that includes the host identifier of the RADIUS proxy node. This step may be performed by RADIUS loop mitigator 202. If RADIUS loop mitigator 202 determines that the proxy state attribute of the message includes the host identifier of RADIUS proxy 200, control proceeds to step 506 where the message is identified as a looped message, and a loop mitigation action is performed. In one example, the loop mitigation action may include discarding the looped message. In step 508, an OAM event is generated for the looped message. Generating an OAM event may include notifying an OAM entity of the looped message and incrementing a counter for the looped message. Control then returns to step 500 where the next message is processed.

Returning to step 504, if it is determined that the RADIUS message does not include the attribute with the host identifier of the RADIUS proxy, control proceeds to step 510 where the host identifier of the RADIUS proxy node and the host identifier of the node that forwarded the message to the RADIUS proxy are inserted in the message. In step 512, the peer to which the message will be forwarded is identified. If the RADIUS proxy is a component of a DSR, identifying the peer may include passing the message to an application that identifies the destination host and performing a lookup in a Diameter route table using the destination host parameter to identify the outbound interface on the DSR to which the message should be forwarded. If the RADIUS proxy is a standalone identity, identifying the peer may include consulting a RADIUS application that identifies the peer and performs a similar lookup in a route table of RADIUS peers.

Referring to FIG. 5B, in steps 514 and 516, it is determined whether the attribute in the RADIUS message includes the identifier of the peer to which the message should be routed. In step 516, if the proxy state or other attribute includes the peer identifier, control returns to step 506 in FIG. 5A where a loop mitigation action is performed for the RADIUS message and step 508 where an OAM event is generated.

If in step 516 it is determined that the proxy state or other attribute does not include the identifier for the peer to which the RADIUS message should be routed, control proceeds to step 518 where the message is forwarded to the RADIUS peer. Control then returns to step 500 in FIG. 5A where the next RADIUS message is processed.

Figure 6A:
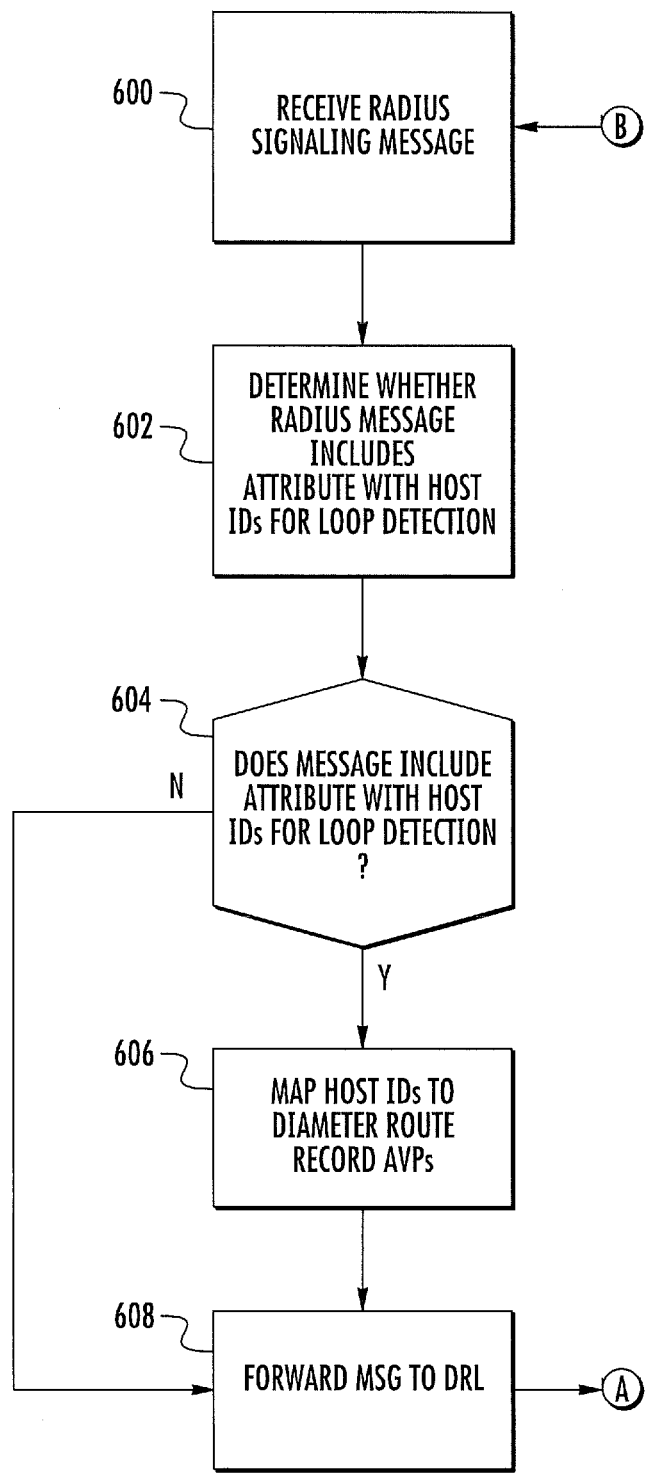
FIGS. 6A-6C are a flow chart illustrating the mapping of RADIUS proxy state attributes to Diameter route record attributes and using a Diameter routing layer to implement loop prevention for incoming RADIUS to outgoing RADIUS or Diameter messages according to an aspect of the subject matter described herein.
Figure 6B:
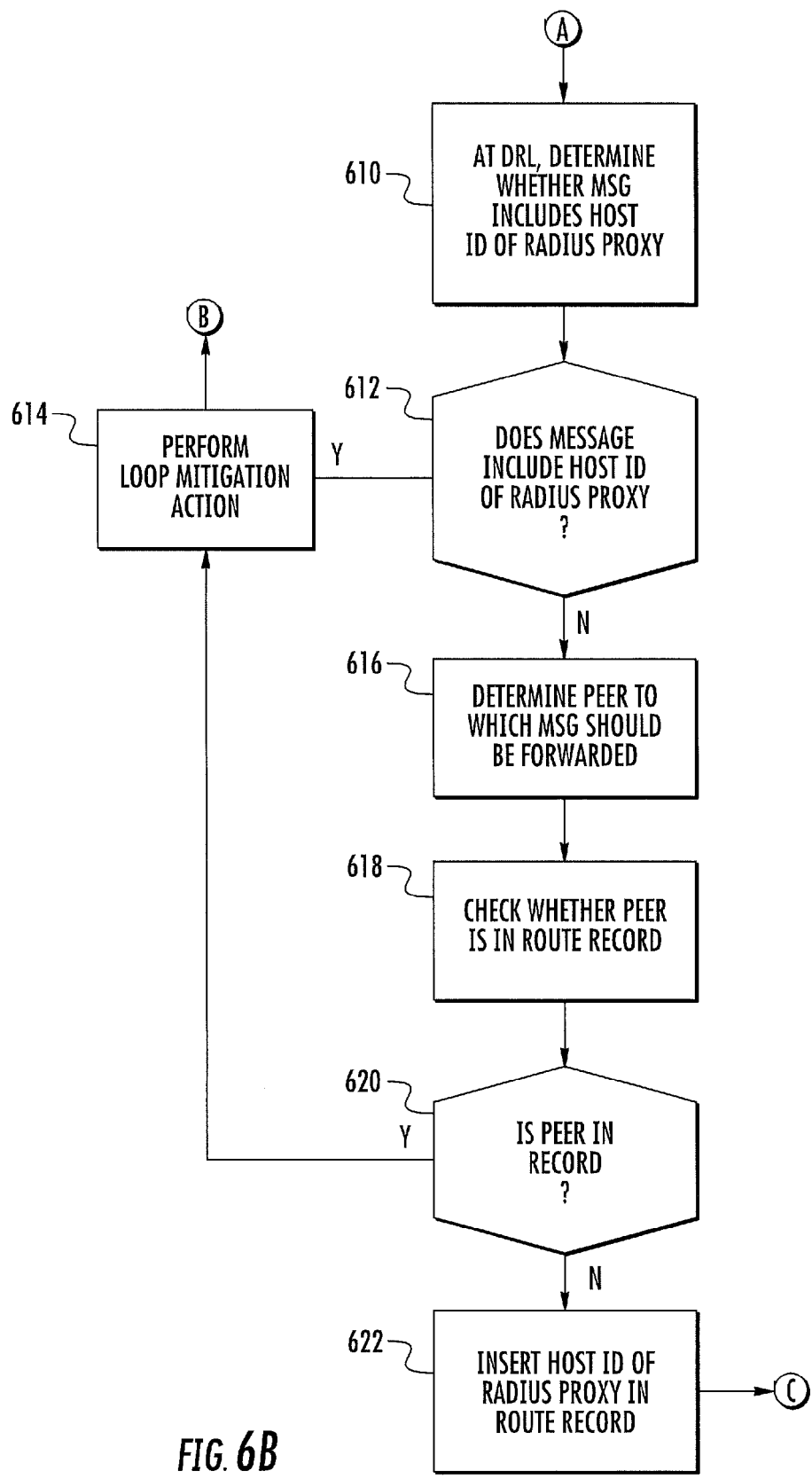

In FIGS. 5A and 5B, the proxy state attribute is used to carry RADIUS loop detection information. In an alternate implementation, RADIUS loop detection information may be mapped to and stored in a Diameter route record attribute and Diameter loop detection functions may be used to identify loops for Diameter encapsulated RADIUS messages. Such an implementation is illustrated by the flow chart illustrated in FIGS. 6A-6C. Referring to FIG. 6A, in step 600, a RADIUS message is received. The RADIUS message may be received by RADIUS loop mitigator 202 illustrated in FIG. 4. In steps 602 and 604, it is determined whether the RADIUS message includes a proxy state attribute or other attribute with host identifiers for loop detection. If the RADIUS message includes such identifiers, control proceeds to step 606 where the host identifiers are mapped to Diameter route record AVPs. The message is then forwarded to the Diameter routing layer. If in step 604 the message does not include the attribute with host identifiers, step 606 is bypassed and control proceeds to step 608 where the message is forwarded to the Diameter routing layer. As stated above with respect to FIG. 4, the RADIUS message may be encapsulated in a Diameter message prior to being forwarded to the Diameter routing layer. Referring to FIG. 6B, in steps 610 and 612, it is determined whether the message includes the host identifier of the RADIUS proxy in the route record AVP. If the message includes the host identifier of the RADIUS proxy, control proceeds to step 614 where a loop mitigation action is performed and then returns to step 600 where the next RADIUS message is processed. The loop mitigation action may include discarding the message. An OAM event may also be generated as described above.

If in step 612 it is determined that the host identifier of the RADIUS proxy is not present in the route record AVP, control proceeds to step 616 where the peer to which the message should be forwarded is determined. Determining the peer to which the message should be forwarded may include passing the message to a Diameter application which identifies the destination host for the message, performing the lookup in a Diameter route table for the destination host, and identifying the outbound interface on the DSR to which the message should be forwarded. In steps 618 and 620, it is determined whether the peer associated with the next hop for the Diameter message is in the route record AVP. In step 620, if the peer is in the route record AVP, control proceeds to step 614, where a loop mitigation action is performed. If in step 620 the peer is not in the route record AVP, control proceeds to step 622 where the host identifier for the RADIUS proxy/DSR is inserted in the Diameter route record AVP.

Figure 6C:
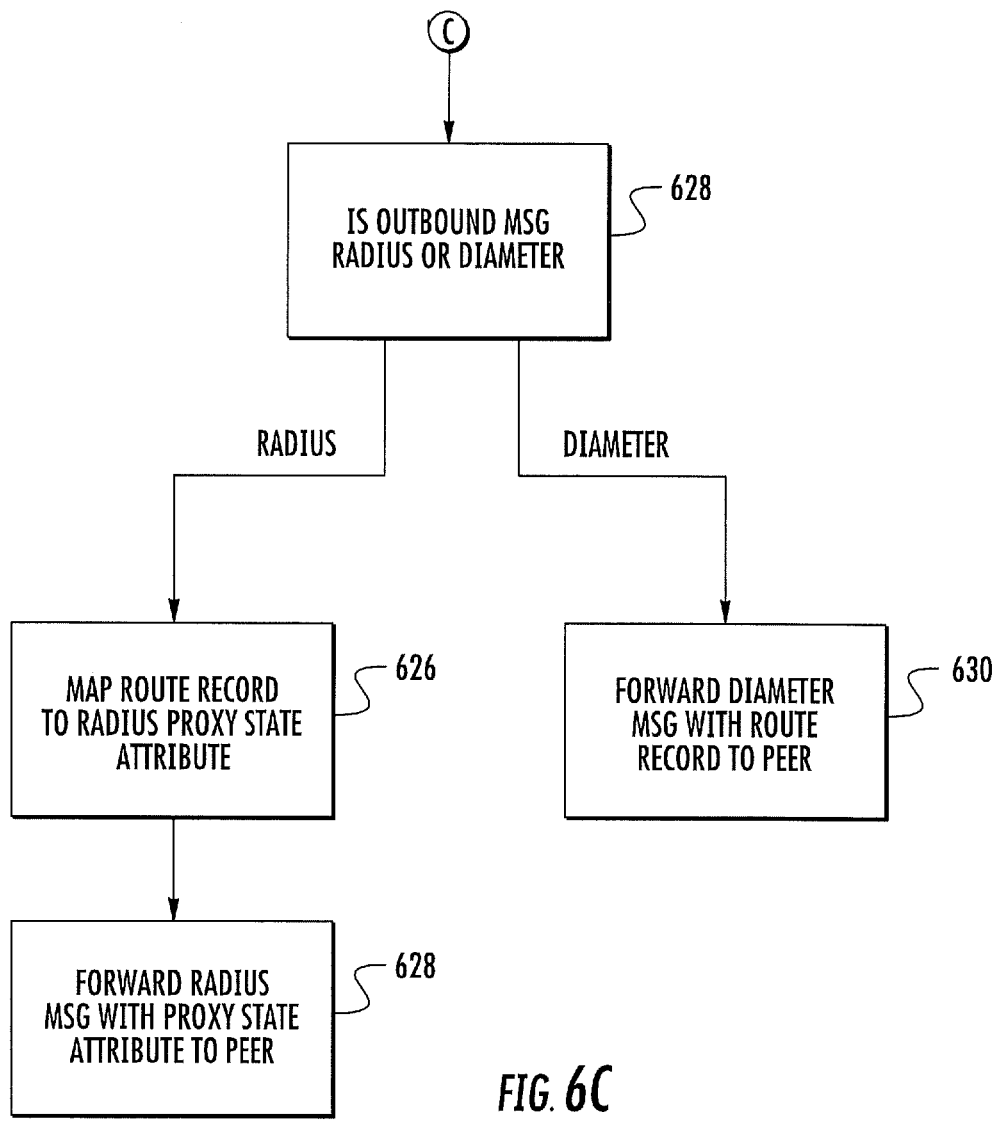

Control then proceeds to step 624 in FIG. 6C where processing varies based on whether the outbound message is RADIUS or Diameter. If the outbound message is a RADIUS message, control proceeds to step 626 where the route record AVP is mapped to RADIUS attributes and step 628 where the RADIUS message with the proxy state attributes storing the loop detection parameters is sent to the RADIUS peer. If the outbound message is Diameter, control proceeds to step 630 where the Diameter message with the route record AVP is forwarded to the next hop Diameter peer. Thus, in FIGS. 6A-6C, RADIUS attributes are mapped to Diameter attributes and used for loop detection and mitigation.

Figure 7A:
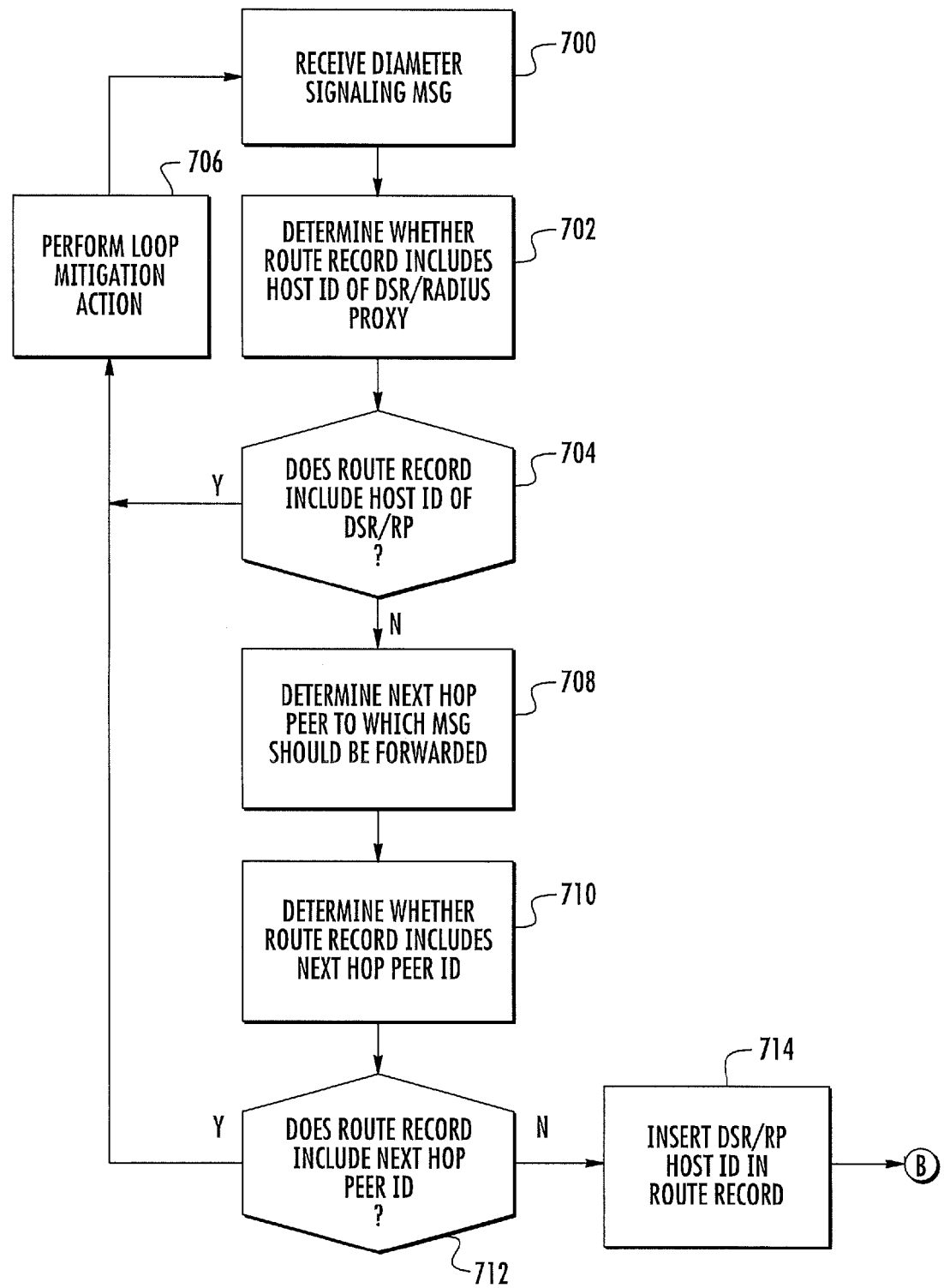
FIGS. 7A-7B are a flow chart illustrating exemplary steps for using a Diameter routing layer to perform loop detection and mitigation for incoming Diameter to outgoing RADIUS or Diameter messages according to an aspect of the subject matter described herein.
Figure 7B:
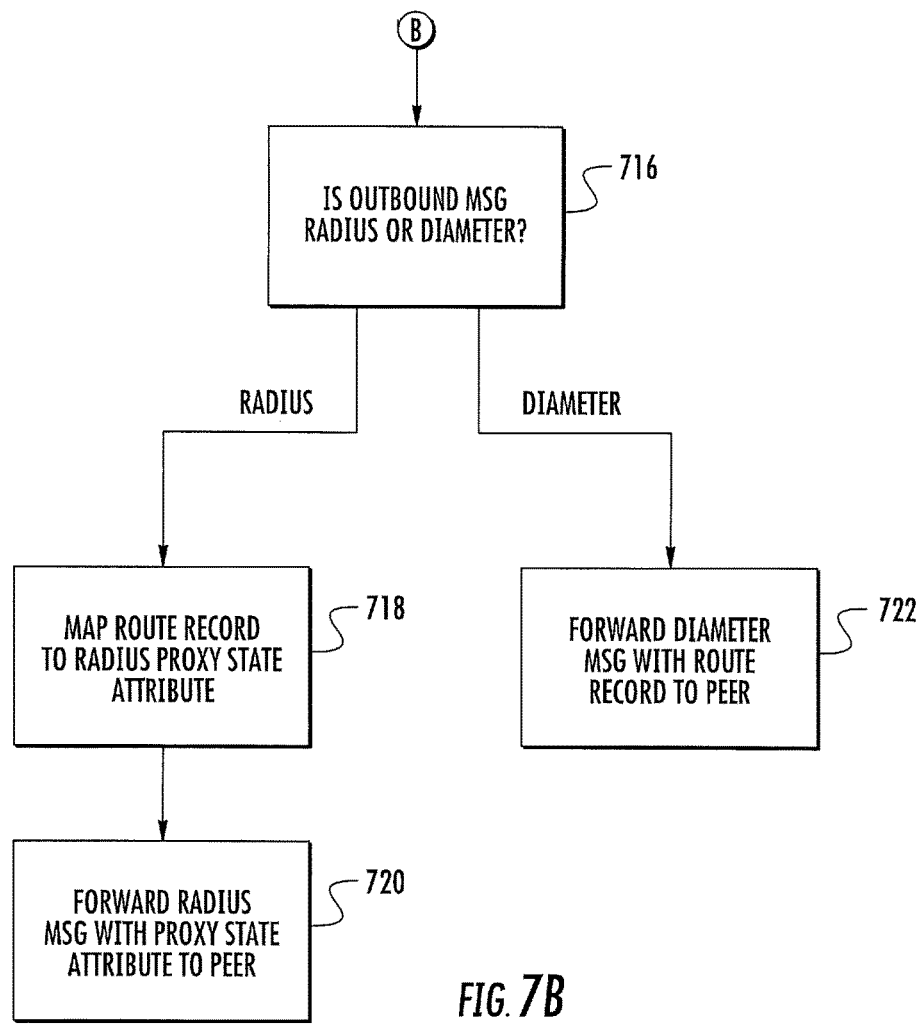

FIGS. 7A and 7B illustrate an exemplary process for loop detection and mitigation by a DSR/RADIUS proxy when the inbound message is a Diameter message. Referring to FIG. 7A, in step 700, a Diameter message is received. The Diameter message may be received by Diameter connection layer 402 illustrated in FIG. 4. In steps 702 and 704, it is determined whether the route record in the Diameter message includes the host identifier of the DSR/RADIUS proxy 400 or 200. In step 704, if it is determined that the route record includes the host ID of the DSR/RADIUS proxy, control proceeds to step 706 where a loop mitigation action is performed and then control returns to step 700 where the next message is processed. Performing a loop mitigation action may include discarding the Diameter message. DSR/RADIUS proxy 400 or 200 may also return an error message to the message sender. An OAM event may also be generated.

Returning to step 704, if it is determined that the route record does not include a host identifier for the DSR/RADIUS proxy, control proceeds to step 708 where the peer to which the message should be forwarded is determined. Determining the peer to which the message should be forwarded may include forwarding the Diameter message to one of applications 406 and 408 which identifies the destination host. DRL 404 may then perform a lookup in a Diameter routing table using the destination host identifier as a lookup key to determine the interface in the DSR corresponding to the next hop to the destination host. In steps 710 and 712, it is determined whether the route record includes the next hop peer identifier. Steps 710 and 712 may be implemented by DRL 404. In step 712, if the route record includes the next hop peer identifier, control proceeds to step 706, where the loop mitigation action is performed and then returns to step 700 where the next message is processed.

If in step 712 it is determined that the route record does not include the identifier of the next hop peer, control proceeds to step 714 where the host identifier of the DSR/

RADIUS proxy is inserted in the route record AVP. Control then proceeds to step 716 in FIG. 7B where processing differs depending on whether the outbound message is RADIUS or Diameter. If the outbound message is RADIUS, control proceeds to step 718 where the route record attributes are mapped to RADIUS attributes, such as RADIUS proxy state attributes. Control then proceeds to step 720 where the RADIUS message with the RADIUS loop detection attributes is forwarded to the next hop RADIUS peer. In step 716, if the outbound message is Diameter, control proceeds to step 722 where the Diameter message with the route record loop detection attributes is forwarded to the next hop Diameter peer.

Figure 8:
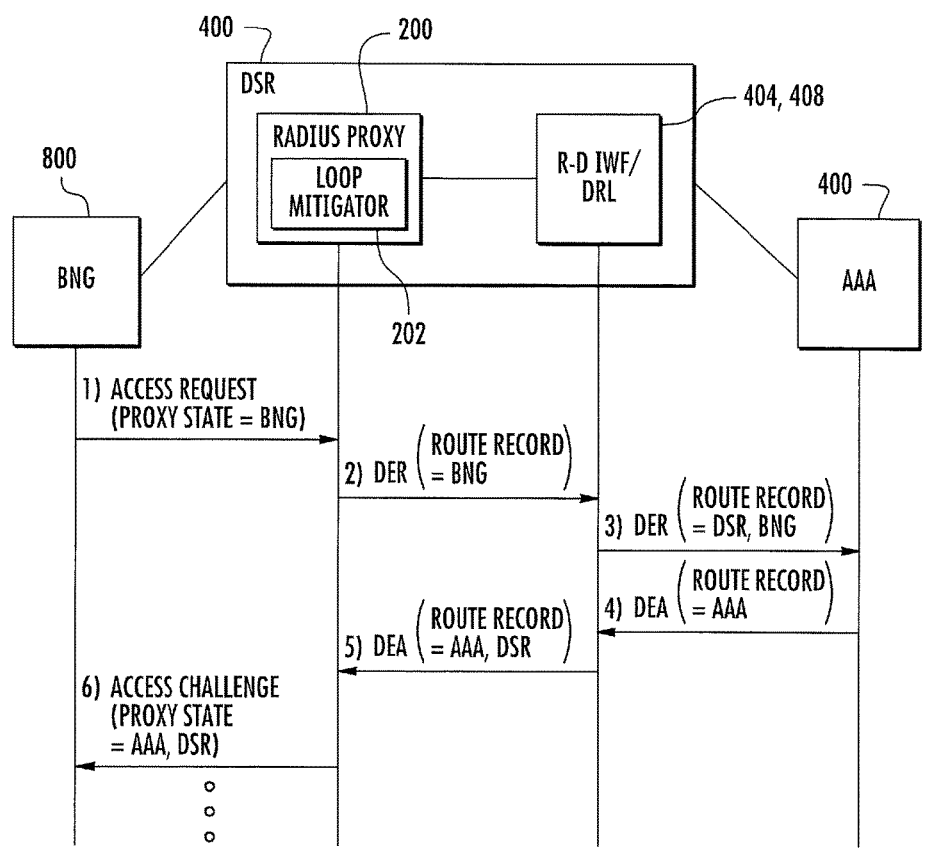
FIG. 8 is a message flow diagram illustrating exemplary loop detection and mitigation for Diameter and RADIUS messages between a broadband network gateway (BNG), a DSR, and an authentication, authorization, and accounting (AAA) server according to an aspect of the subject matter described herein.

FIG. 8 is a message flow diagram illustrating exemplary authentication messages that are exchanged between a BNG and an AAA server when no message looping occurs, but where an intermediate DSR with a RADIUS proxy 200 implements loop detection mitigation according to an aspect of the subject matter described herein. Referring to FIG. 8, in step 1, BNG 800 sends a RADIUS access request message. In the illustrated example, it is assumed that BNG 800 implements RADIUS message loop detection measures. Accordingly, the access request message includes a proxy state attribute that identifies the BNG. DSR 400 receives the RADIUS message where it is processed by RADIUS proxy 200 with RADIUS loop mitigator 202. Processing the message may include determining whether the message includes the host identifier of the DSR or RADIUS proxy. In this example, the message does not include the host identifier of the DSR or RADIUS proxy, so the message is not a looped message. Accordingly, in step 2, the message is encapsulated in a Diameter message and forwarded to RD-IWF and DRL for Diameter processing. The proxy state attributes are mapped to Diameter route record attributes before forwarding the message. RD-IWF and DRL 404 and 406 identify AAA server 108 as the destination and determine that the outbound message is a Diameter message. Since the route record does not include AAA server 108, the outbound message is not a looped message and in step 3, DSR 400 forwards DER message with route record attributes identifying the DSR and the BNG to AAA server 108.

AAA server 108 receives the DER message and formulates a corresponding DEA message. It is assumed that AAA server 108 implements Diameter loop detection features and inserts its own identifier in the route record AVP of the DEA message. AAA server 108 sends the DEA message to BNG 800 via DSR 400. DSR 400 receives the DEA message, determines that the message is not looped, and inserts the identifier of DSR and keeps the identifier of AAA server 108 in the route record. The destination for the message is identified as BNG 800. The outbound message type is RADIUS. Accordingly, RADIUS loop mitigator 202 may determine whether the outbound message is looped by examining whether the proxy state attribute to which the route record attributes are mapped includes the identifier of BNG 800. In this example, the outbound message does not include the identifier of BNG 800. Accordingly, RADIUS proxy 200 formulates an access challenge message with the proxy state attribute of AAA server 108 and DSR 400 in the message. DSR 400 forwards the message to BNG 800. BNG 800 receives the message, identifies the message as not being looped, and processes the access challenge message. Thus, in FIG. 8, RADIUS and Diameter loop detection methods are implemented, which prevent loops even when RADIUS to Diameter interworking is performed.

Figure 9:
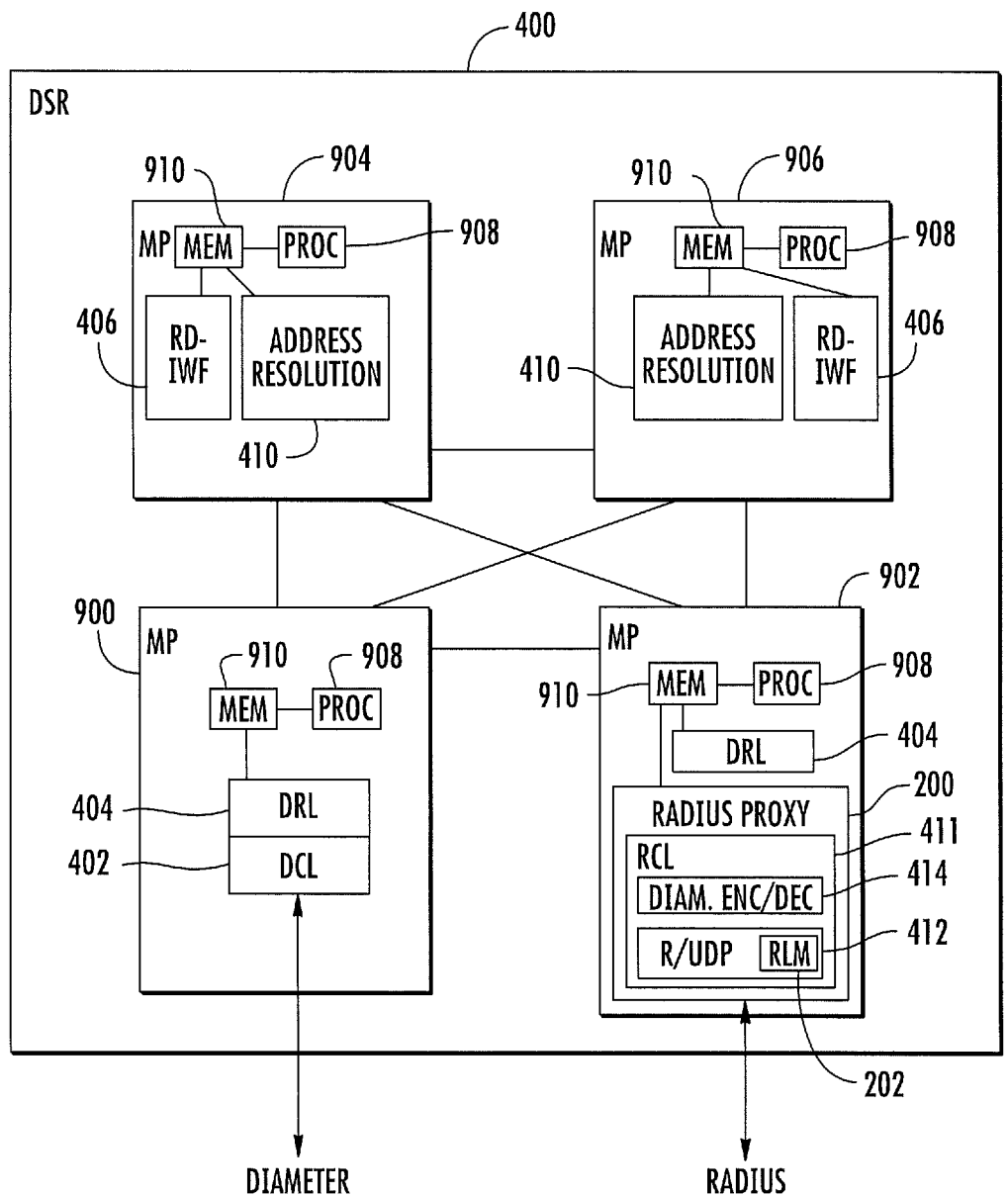
FIG. 9 is a block diagram illustrating an exemplary hardware architecture for a DSR with an internal RADIUS proxy according to an aspect of the subject matter described herein.

FIG. 9 is a block diagram illustrating an exemplary hardware architecture for DSR and/or RADIUS proxy 200.

Referring to FIG. 9, DSR 400 includes a plurality of message processors 900, 902, 904, and 906. Each message processor 900, 902, 904, and 906 may be implemented using a printed circuit board that plugs into a back plane or other suitable interconnection. Each message processor 900, 902, 904, and 906 include one or more processors 908 and memory 910. Each processor 908 may be a single or multicore microprocessor that executes instructions stored in its respective memory 910.

In the illustrated example, message processor 902 implements RADIUS proxy 200, including RADIUS connection layer 411, RADIUS/UDP message handler 412, Diameter encapsulation/de-encapsulation module 414, and RADIUS loop mitigator 202. Message processor 904 implements RADIUS-Diameter interworking function 406 and address resolution 410. Message processor 906 also implements RADIUS-Diameter interworking function 406 and address resolution 410. Inbound RADIUS messages may be load shared among message processors 904 and 906, as message processors 904 and 906 perform identical functions in this example. Message processor 900 implements DRL 404 and DCL 402.

Thus, the hardware architecture illustrated in FIG. 9 includes physical components of a DSR 400 for implementing RADIUS and Diameter loop detection functions. If RADIUS proxy 200 is implemented as a standalone entity, the architecture may be the same as that illustrated in FIG. 9, except that DRL, DCL, and interworking functions may be omitted.

Thus, according to the subject matter described herein, RADIUS and RADIUS/Diameter loop detection and mitigation functions are implemented in a RADIUS proxy, either as a standalone entity or as a component of a DSR. Such a system improves the efficiency of networks that forward RADIUS and Diameter messages by reducing the likelihood of message loops that involve RADIUS and/or Diameter messages. Such loop detection and mitigation solve the problem of mitigating RADIUS and Diameter message loops, where the problem is necessarily rooted in RADIUS and Diameter networks, as the looping of RADIUS and Diameter messages does not exist outside the domain of RADIUS and Diameter networks. The RADIUS and Diameter loop detection described herein may also improve the technological field of network security by reducing the likelihood of successful cyber attacks using looped Diameter or RADIUS messages.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for remote authentication dial in user service (RADIUS) message loop detection and mitigation, the method, comprising:

receiving, by a RADIUS proxy node comprising a computing platform including at least one processor, a RADIUS signaling message transmitted by a RADIUS client over a network;

inserting a host identifier of the RADIUS proxy node into the RADIUS signaling message;

forwarding, by the RADIUS proxy node, the RADIUS signaling message to a RADIUS peer over the network;

receiving, by the RADIUS proxy node, the RADIUS signaling message transmitted by another node over the network;

determining, by the RADIUS proxy node, that the RADIUS signaling message transmitted by another node includes an attribute having the host identifier inserted by the RADIUS proxy node; and in response to determining that the RADIUS signaling message transmitted by another node includes the attribute having the host identifier inserted by the RADIUS proxy node, performing, by the RADIUS proxy node, a RADIUS loop mitigation action for the RADIUS signaling message transmitted by another node.

2. The method of claim 1 wherein the RADIUS proxy node is a component of a Diameter signaling router (DSR) that performs Diameter routing and provides RADIUS proxy services.

3. The method of claim 2 comprising receiving a Diameter message, identifying a corresponding outbound message as a RADIUS message, and performing loop detection for the Diameter message and the outbound message.

4. The method of claim 1 wherein the RADIUS proxy node comprises a standalone RADIUS proxy that provides RADIUS proxy services.

5. The method of claim 1 wherein the attribute comprises a proxy state attribute of the RADIUS signaling message.

6. The method of claim 1 wherein the attribute comprises a Diameter route record attribute value pair of a Diameter envelope that carries the RADIUS signaling message.

7. A system for remote authentication dial in user service (RADIUS) message loop detection and mitigation, the system, comprising:

a RADIUS proxy node comprising a computing platform having at least one processor, the RADIUS proxy node including:

a RADIUS connection layer for receiving a RADIUS signaling message transmitted by a RADIUS client over a network; and a RADIUS loop mitigator for inserting a host identifier of the RADIUS proxy node into the RADIUS signaling message, forwarding, the RADIUS signaling message to a RADIUS peer over the network, receiving the RADIUS signaling message transmitted by another node over the network, determining that the RADIUS signaling message transmitted by another node includes an attribute having the host identifier corresponding to inserted by the RADIUS proxy node, and, in response to determining that the RADIUS signaling message transmitted by another node includes the attribute having the host identifier inserted by the RADIUS proxy node, performing a RADIUS loop mitigation action for the RADIUS signaling message transmitted by another node.

8. The system of claim 7 comprising a Diameter signaling router (DSR), wherein the RADIUS proxy node is a component of the DSR.

9. The system of claim 8 wherein the DSR receives a Diameter message, identifies a corresponding outbound message as a RADIUS message, and performs loop detection for the Diameter message and the outbound message.

10. The system of claim 7 wherein the RADIUS proxy node comprises a standalone node that provides RADIUS proxy services.

11. The system of claim 7 wherein the attribute comprises a proxy state attribute of the RADIUS signaling message or a Diameter route record attribute value pair of a Diameter envelope that carries the RADIUS signaling message.

12. A non-transitory computer readable medium having stored thereon executable instructions that when executed by a processor of a computer control the computer to perform steps comprising:

receiving, by a remote dial in user service (RADIUS) proxy node comprising a computing platform including at least one processor, a RADIUS signaling message transmitted by a RADIUS client over a network;

inserting a host identifier of the RADIUS proxy node into the RADIUS signaling message;

forwarding, by the RADIUS proxy node, the RADIUS signaling message to a RADIUS peer over the network;

receiving, by the RADIUS proxy node, the RADIUS signaling message transmitted from another node over the network;

determining, by the RADIUS proxy node, that the RADIUS signaling message transmitted by another node includes an attribute having the host identifier inserted by the RADIUS proxy node; and in response to determining that the RADIUS signaling message transmitted by another node includes the attribute having the host identifier inserted by the RADIUS proxy node, performing, by the RADIUS proxy node, a RADIUS loop mitigation action for the RADIUS signaling message transmitted by another node.

* * * * *

UNITED STATES PATENT AND TRADEMARK OFFICE
CERTIFICATE OF CORRECTION

PATENT NO. : 9,923,984 B2  
APPLICATION NO. : 14/928660  
DATED : March 20, 2018  
INVENTOR(S) : McCann et al.

Page 1 of 1

It is certified that error appears in the above-identified patent and that said Letters Patent is hereby corrected as shown below:

In the Specification

In Column 4, Line 52, after "point" insert -- . --.

In the Claims

In Column 13, Line 44, in Claim 7, after "identifier" delete "corresponding to".

Signed and Sealed this  
Fourth Day of September, 2018

Andrei Iancu  
*Director of the United States Patent and Trademark Office*